June 1, 1965 R. L. BEYERSTEDT 3,186,015
STREET SWEEPER
Filed July 6, 1951 14 Sheets-Sheet 12

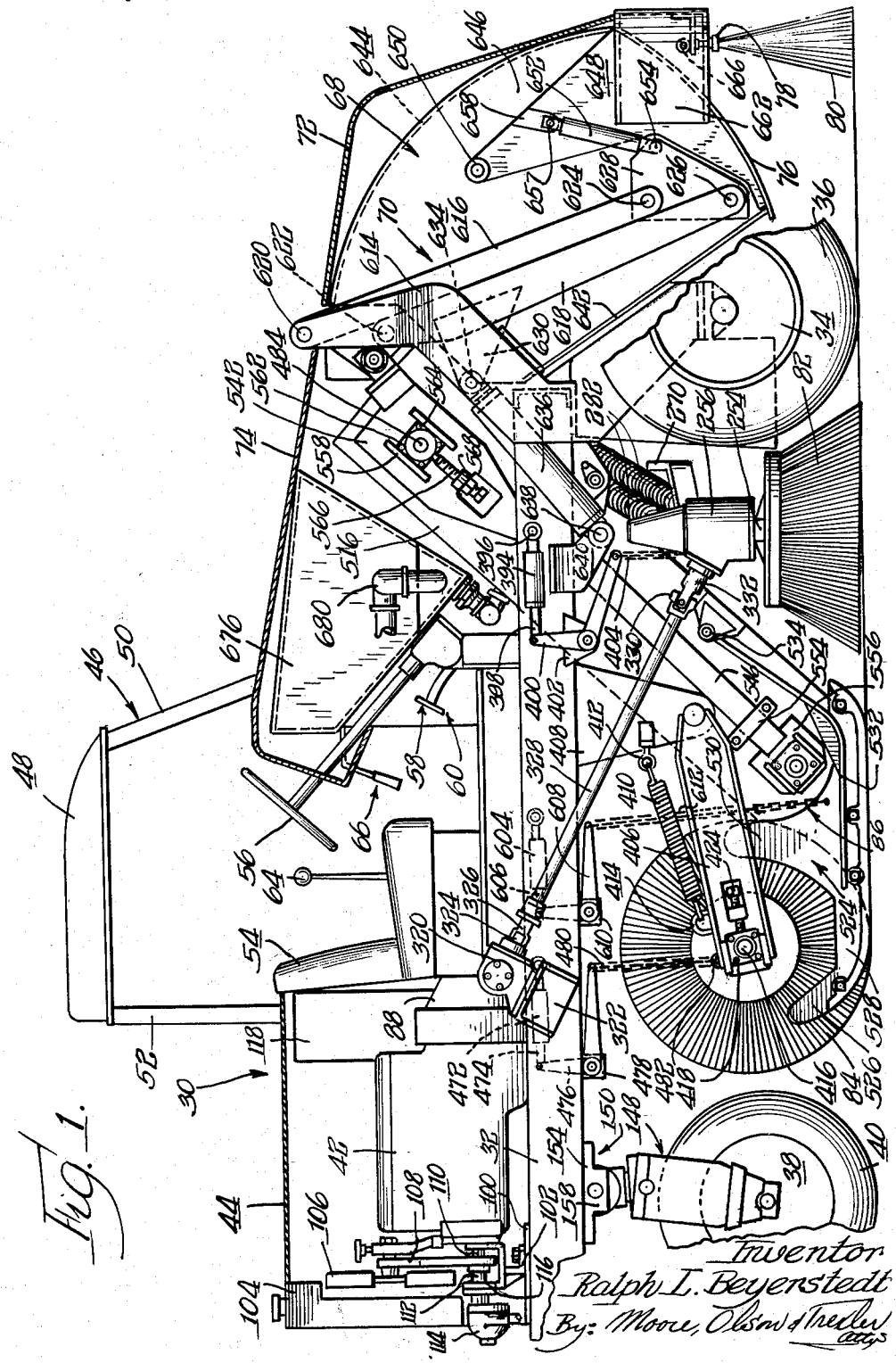

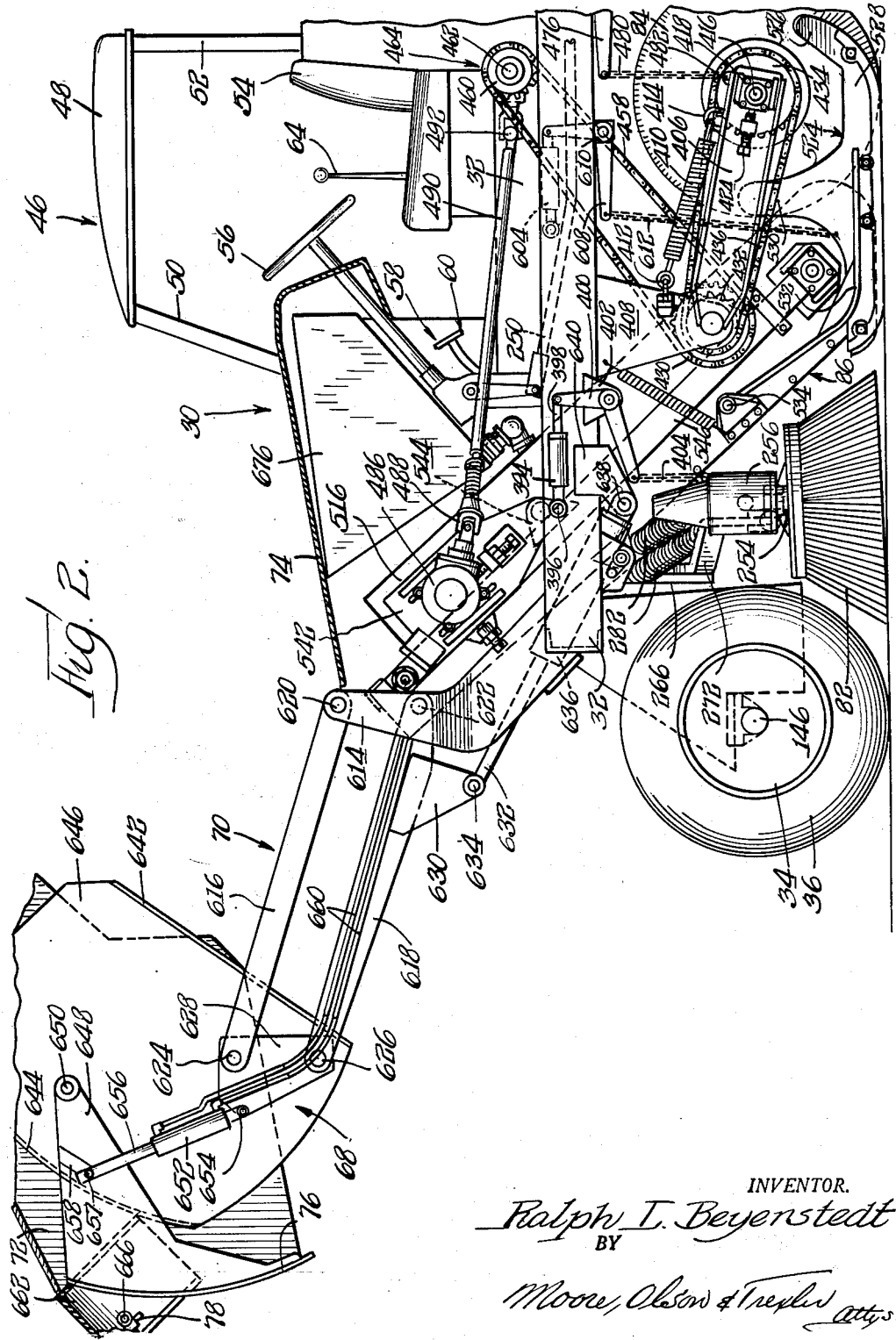

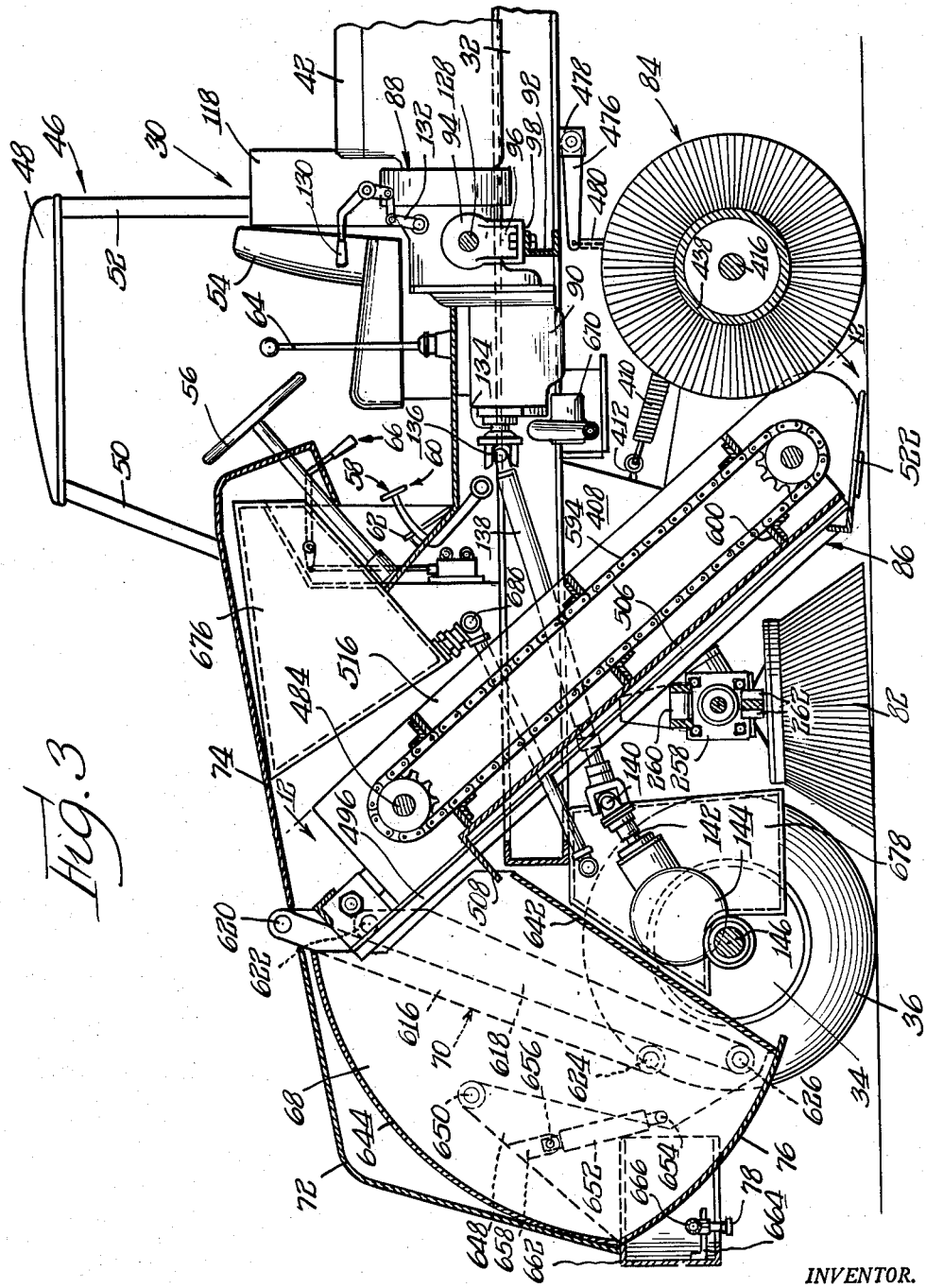

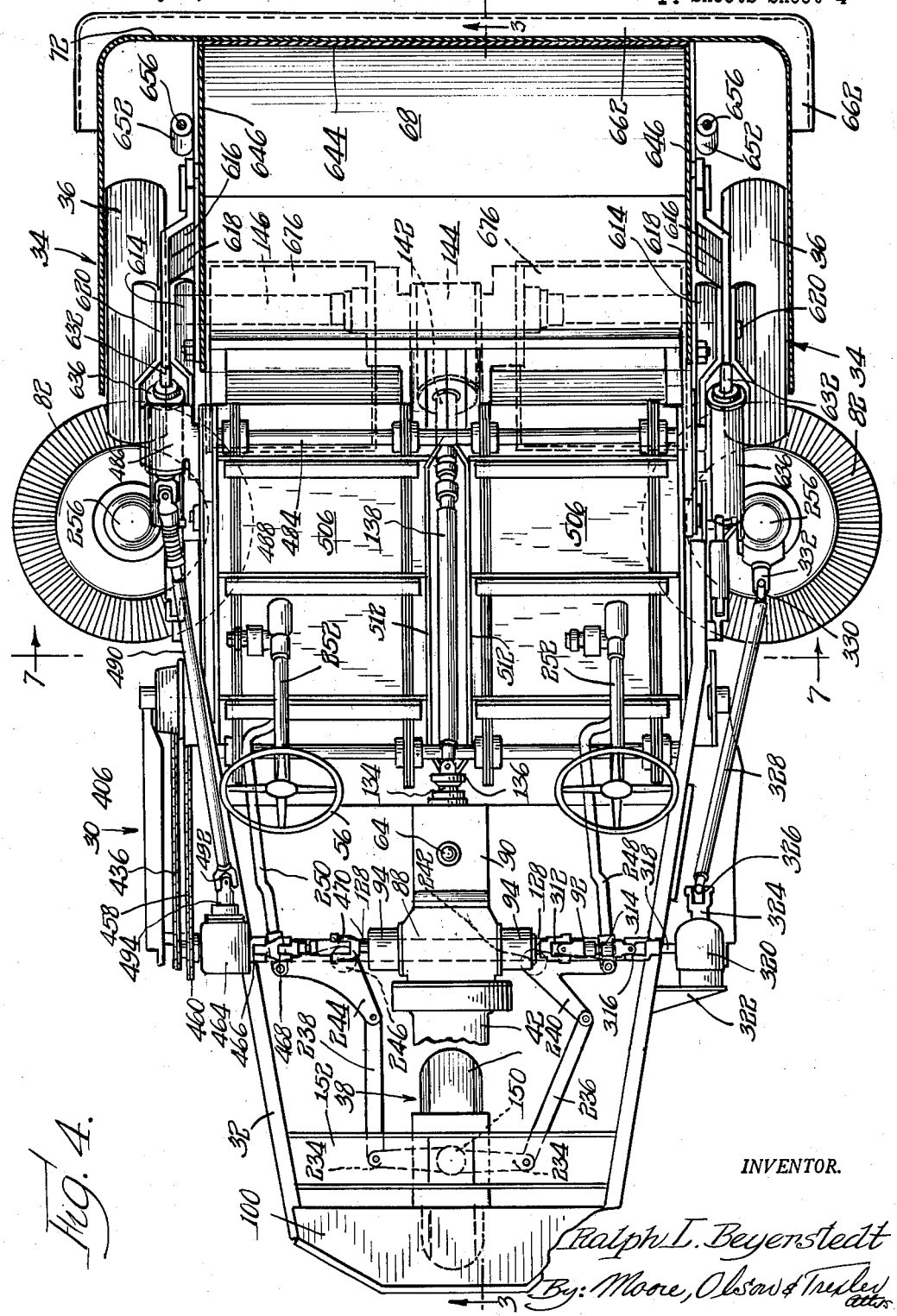

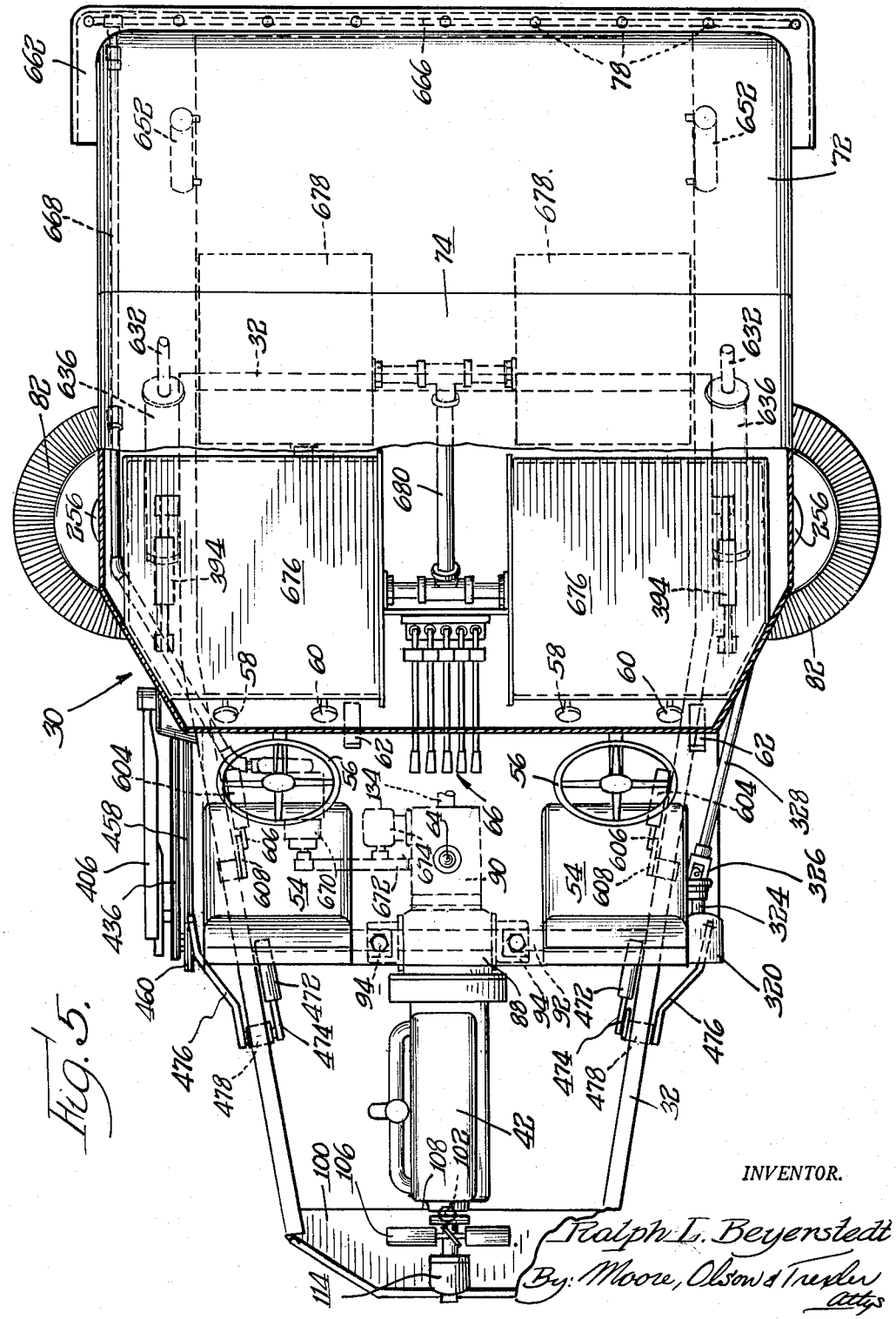

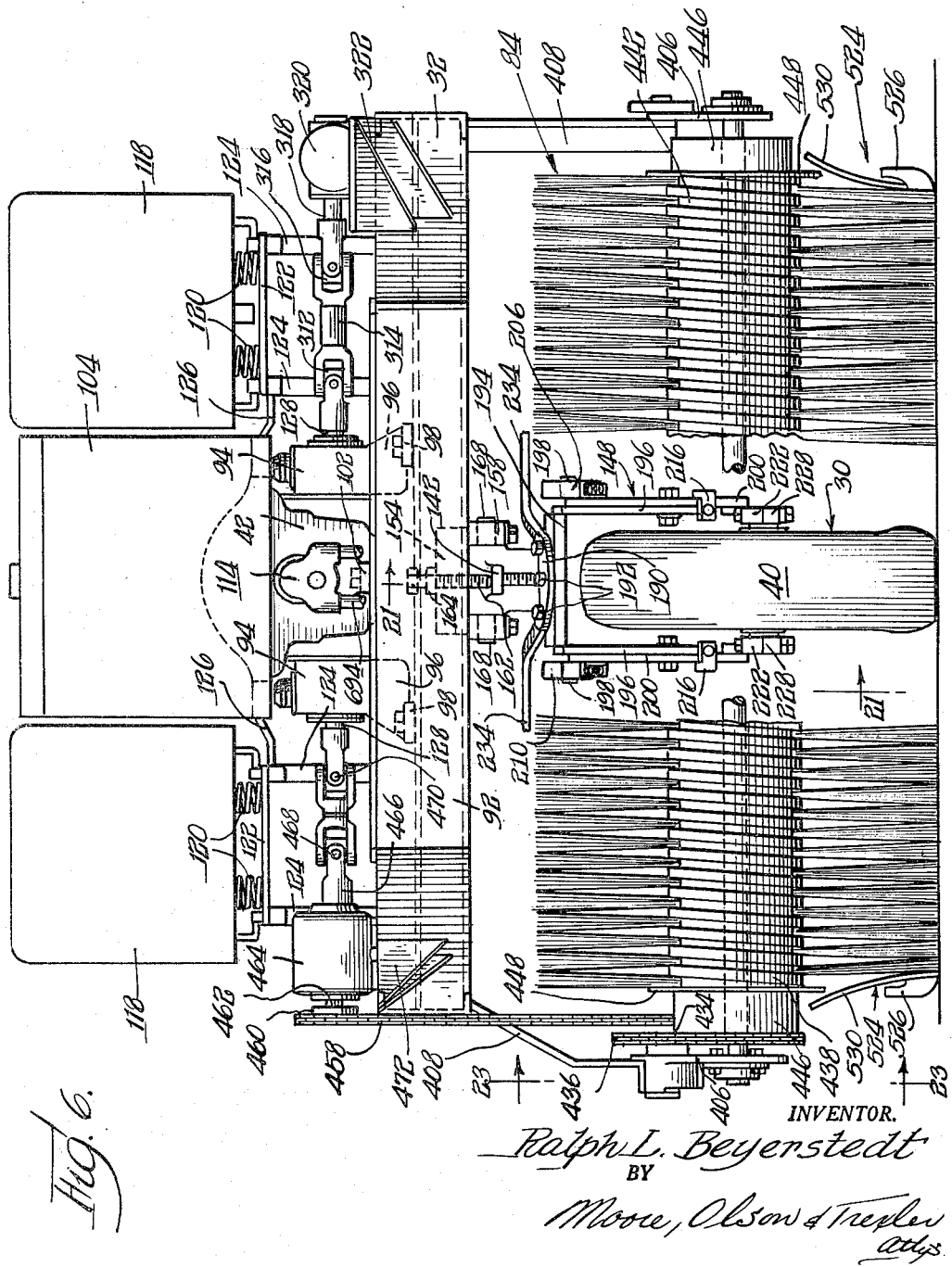

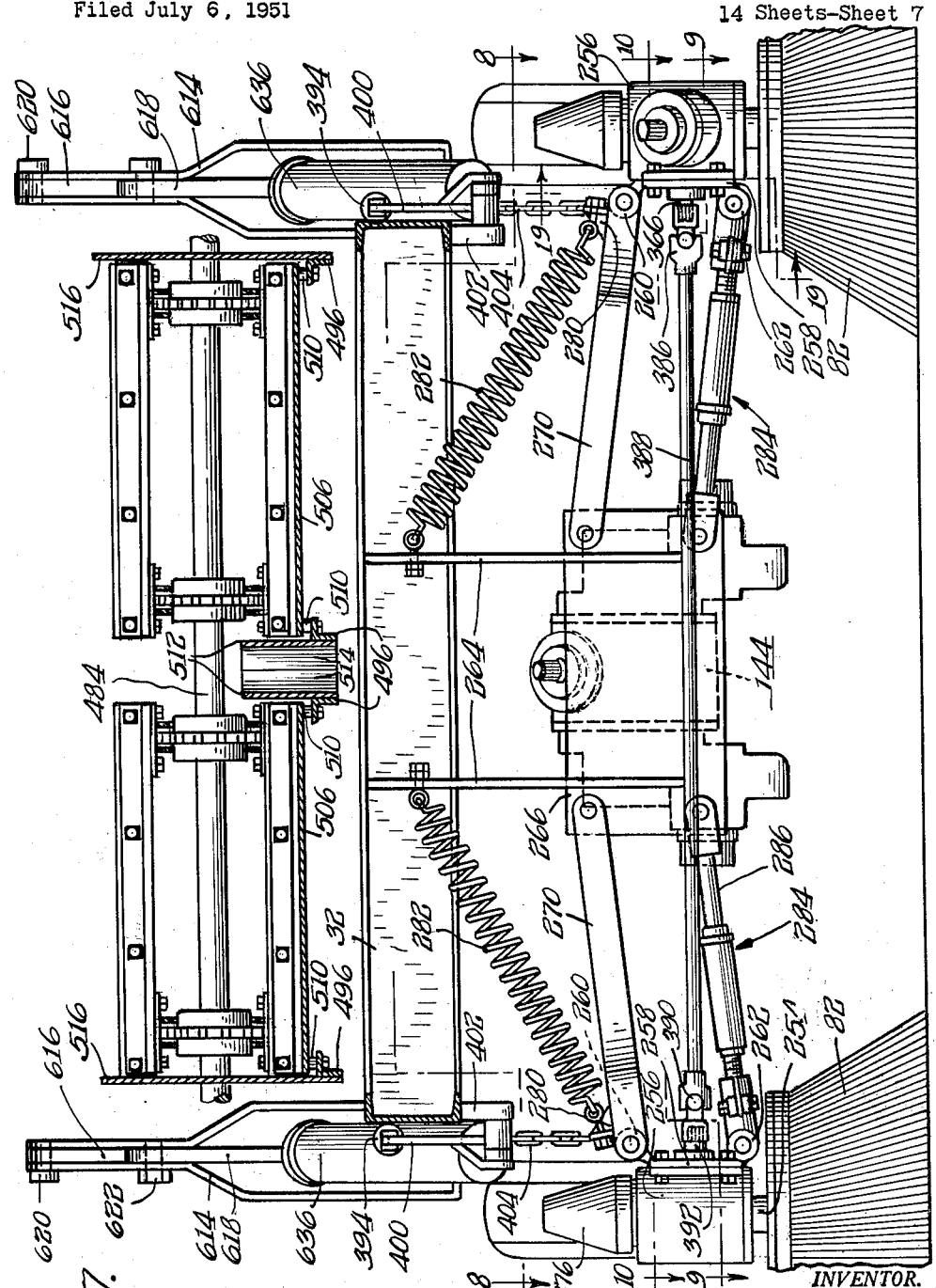

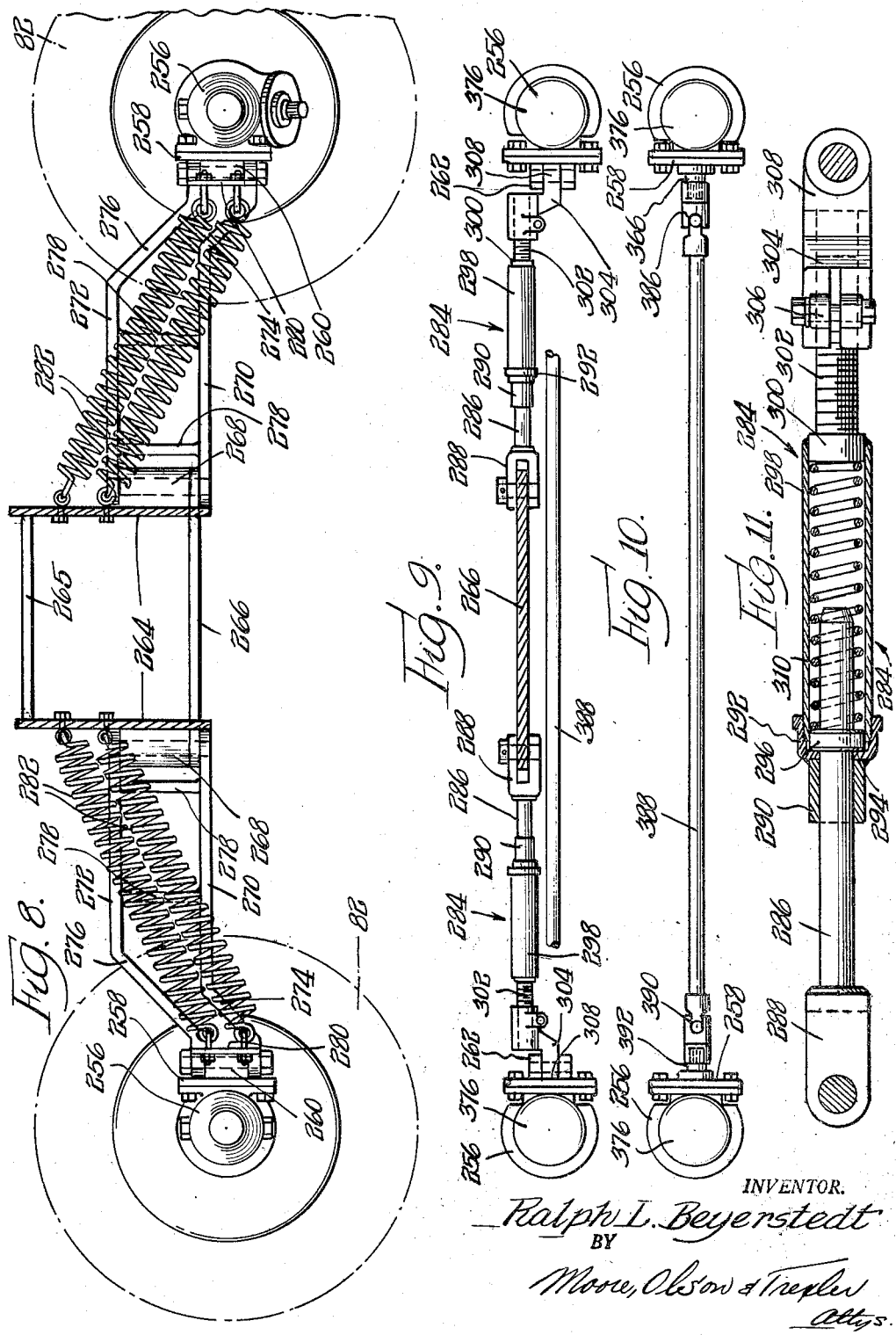

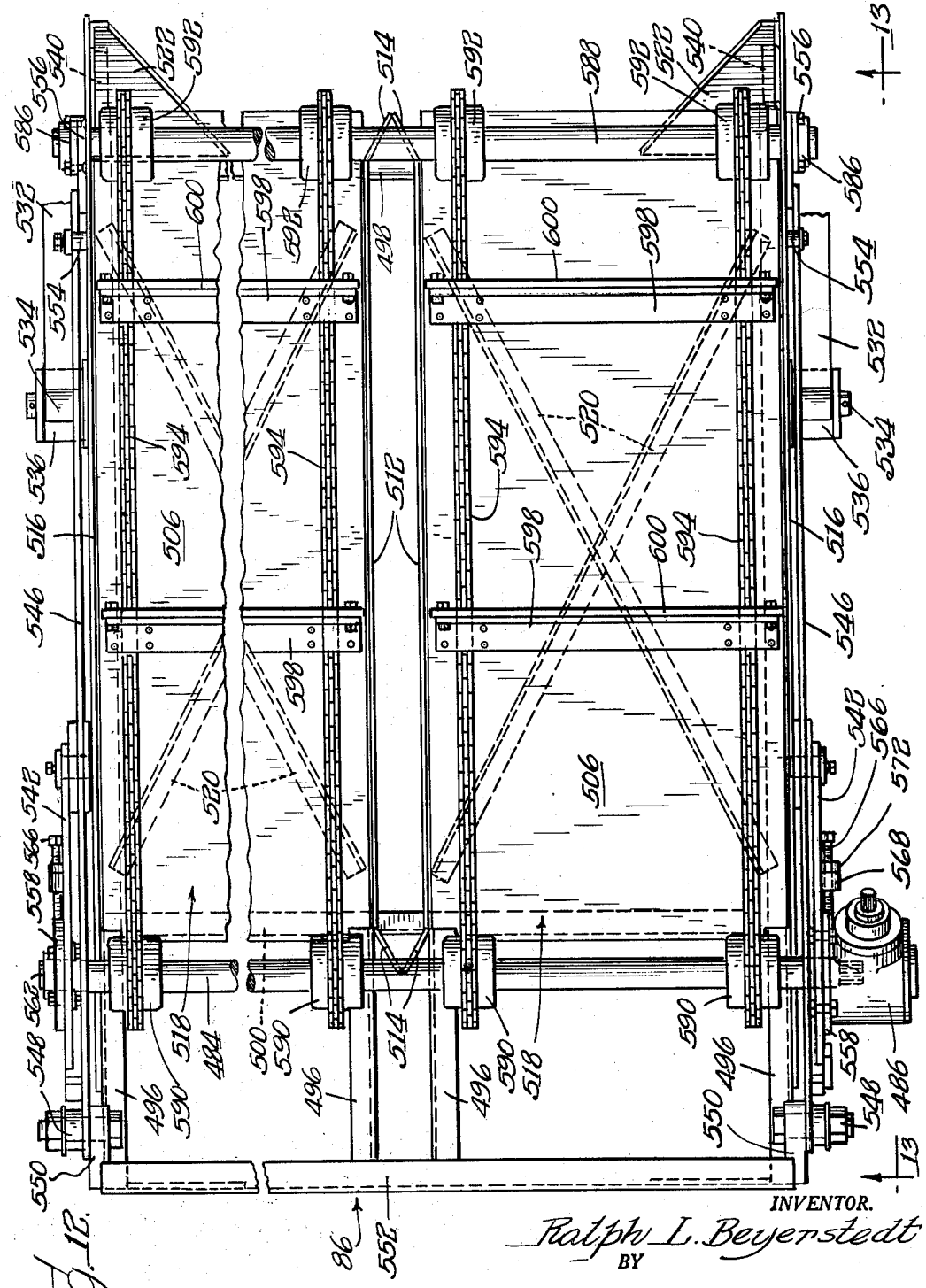

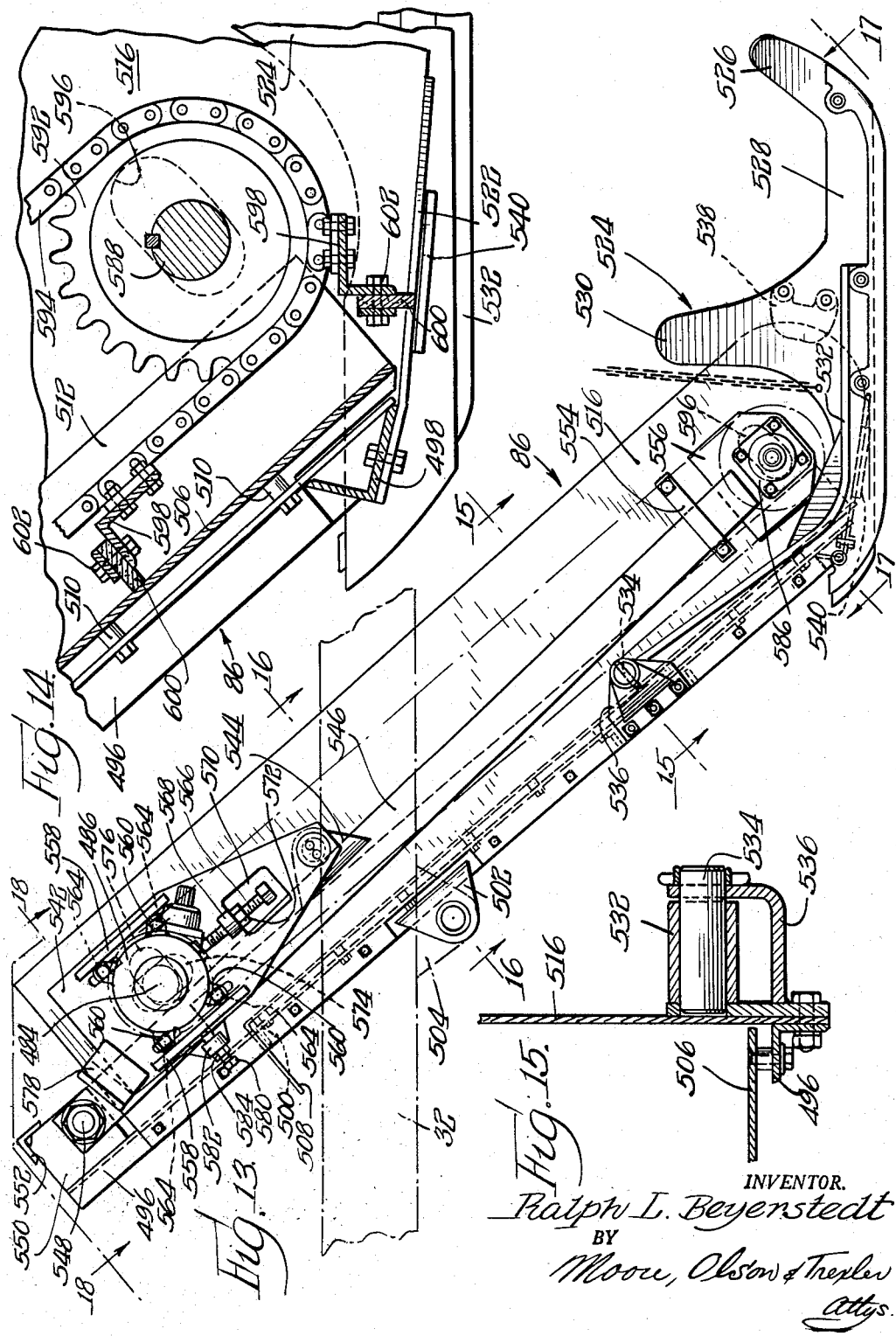

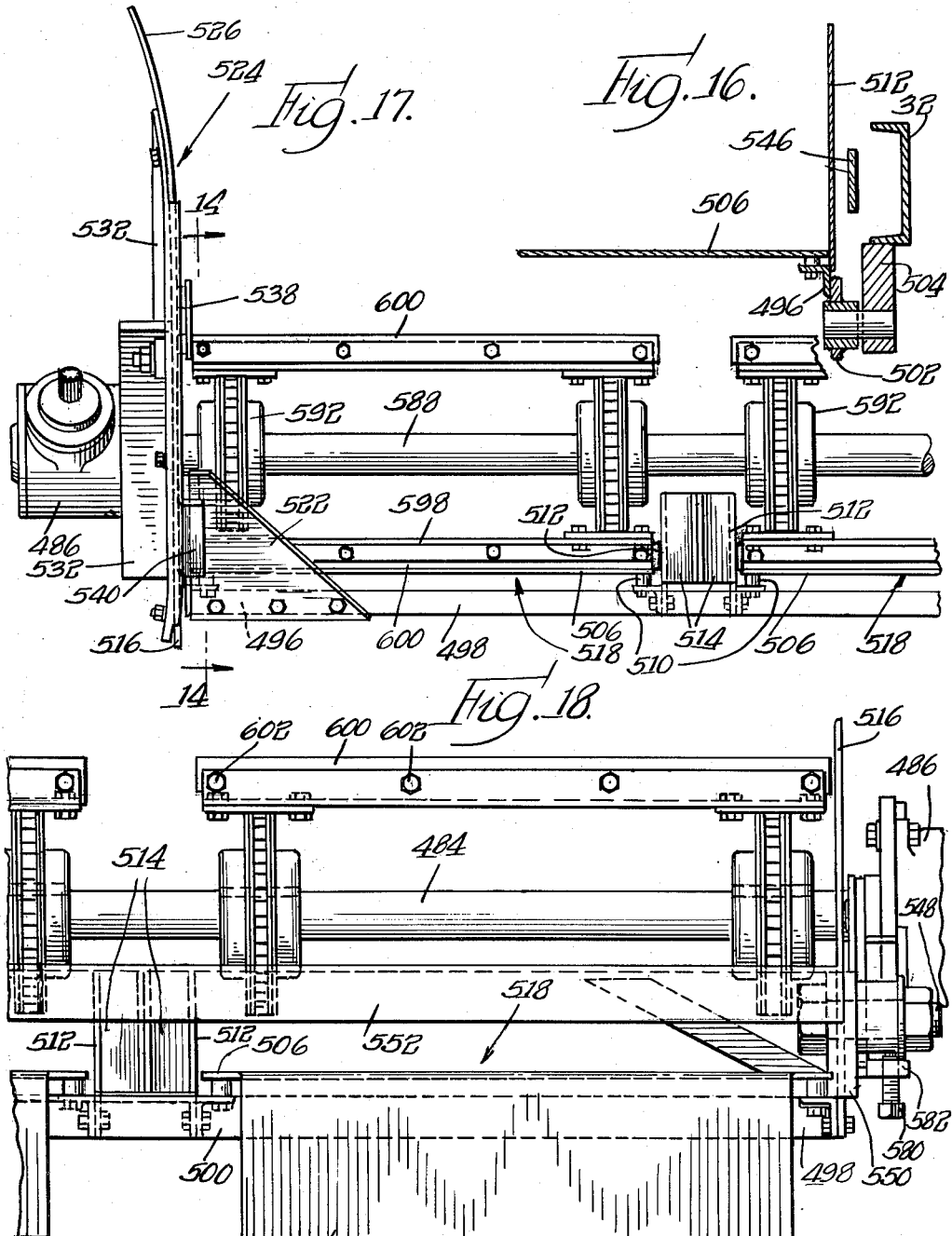

INVENTOR.
Ralph L. Beyerstedt
BY
Moore, Olson & Trexler
Attys.

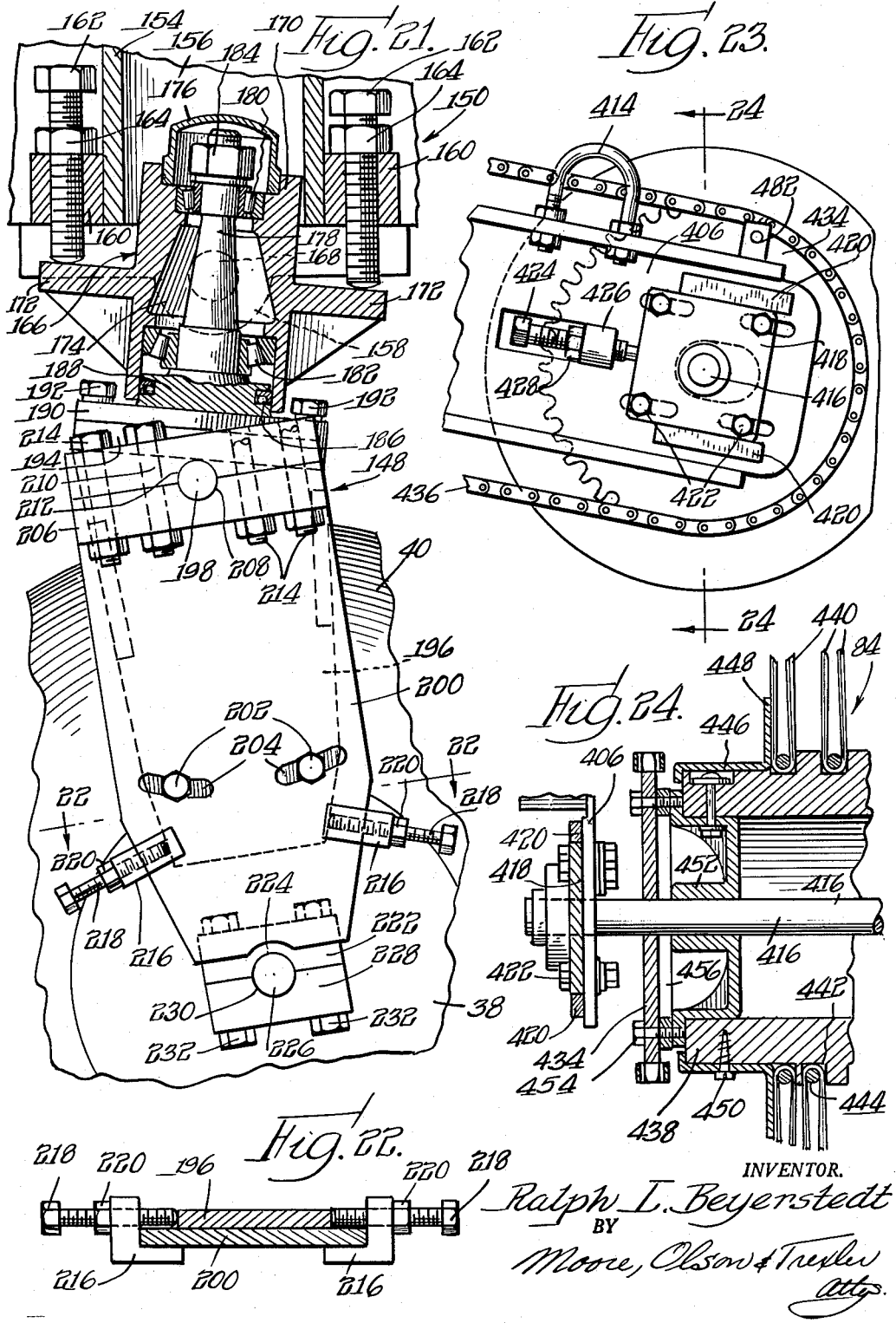

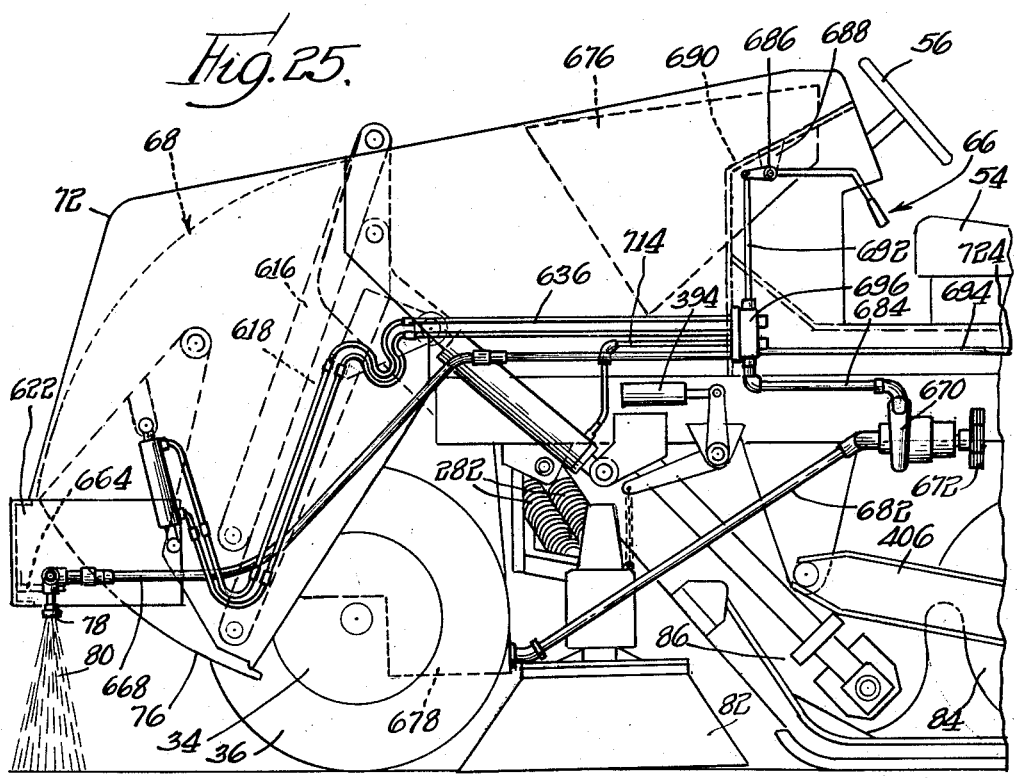

United States Patent Office 3,186,015
Patented June 1, 1965

3,186,015
STREET SWEEPER
Ralph L. Beyerstedt, Libertyville, Ill., assignor, by mesne assignments, to Elgin Sweeper Company, Elgin, Ill., a corporation of Delaware
Filed July 6, 1951, Ser. No. 235,403
19 Claims. (Cl. 15—84)

This invention is concerned generally with a street sweeper and particularly with a street sweeper of the type adapted to pick up dirt from the streets rather than merely brushing the dirt to one side.

This appliaction is a continuation-in-part of my application for "Street Sweeper," Serial No. 629,633, filed November 19, 1945 and now abandoned.

This invention contemplates the provision of a street sweeper wherein dirt is elevated from street level and dumped into a dirt box. The dirt box in turn is designed to be elevated so that the dirt may be dumped directly into a truck or other conveyance rather than being dumped on the street with the resulting unsightly appearance and the expense and waste of time attendant upon the shoveling of dirt from the street level into the truck or other conveyance.

An object of this invention is to provide a new or improved street sweeper.

Another object of this invention is to provide a street sweeper having a dirt or dust box forming a removable front end of the vehicle body and adapted to receive dirt form an elevating mechanism.

A further object of this invention is to provide, in a street sweeper, a dirt or dust box mounted for forward and upward swinging from interfitting relation with a cowl part of the street sweeper body for dumping of dirt from the box.

A more specific object of this invention is to provide, in a street sweeper, a dirt or dust box mounted on a boom for forward and upward movement away from interfitting relation with the sweeper body for dumping of dirt from the box.

Yet another object of this invention is to provide a street sweeper having a dirt or dust box mounted beneath a forward cowl section wherein both the cowl section and dust box are shiftable forwardly and upwardly for dumping of dirt from the box.

Another object of this invention is to provide, in a street sweeper, a dirt or dust box shiftable upwardly and forwardly of the street sweeper for dumping dirt from the box, the box at no time being tipped from its original position.

A more particular object of this invention is to provide an improved street sweeper dust box and cooperating closure member therefor.

Another object of this invention is to provide, in a street sweeper, hydraulic closure acutator mechanism carried by and shiftable with an upwardly and forwardly swingable dust box.

An important object of this invention is to provide a split or duplicated elevator structure in a street sweeper for raising dirt substantially from street level to the top of a dust box or dirt collector.

The present invention contemplates the provision of a split or duplicated elevator mechanism with a vehicle drive shaft passing between the parts of the elevator mechanism. This makes possible the use of a conventional truck type differential and axle without additional gear boxes, chains, or special drive mechanisms that would be necessary to drive around the elevator mechanism. The split or duplicate construction of the elevator mechanism facilitates servicing and reduces weight on the squeegees bearing on the bottom scrub plate with resultant increased life expectancy of the squeegees and scrub plate.

A single motor is utilized as a source of motive power power for the street sweeper disclosed herein and for driving a plurality of brushes and an elevating mechanism. The street sweeper disclosed herein is of relatively large size and the relatively small percentage deflection of the frame members under stress results in an actual deflection of appreciable magnitude. Interconnection of the engine and various transmissions by flexible couplings is undesriable due to the excessive wear and resultant expense involved in the flexible couplings.

An object of this invention is to provide, in a street sweeper, an engine and a plurality of transmissions bolted together as a rigid unit and supported by a three point suspension.

FIG. 1 is a side view partially in section of a street sweeper embodying the principles of my invention;

FIG. 2 is a similar view taken from the opposite side of the sweeper and with the dust box in elevated position;

FIG. 3 is a view similar to FIG. 2 with the dust box in lowered position and comprises a cross section taken substantially through the center of the sweeper as indicated along the line 3—3 of FIG. 4;

FIG. 4 is a top view of the sweeper with certain parts thereof removed for clarity of illustration;

FIG. 5 is a top view similar to FIG. 4 and bringing out different features of construction;

FIG. 6 is a rear view of the sweeper with certain parts omitted;

FIG. 7 is a cross sectional view taken substantially along the line 7—7 of FIG. 4;

FIG. 8 is a horizontal sectional view taken substantially along the line 8—8 of FIG. 7;

FIG. 9 is a horizontal sectional view taken substantially along the line 9—9 of FIG. 7;

FIG. 10 is a horizontal sectional view taken substantially along the line 10—10 of FIG. 7;

FIG. 11 is a detailed longitudinal sectional view of one of the telescoping links of FIG. 9;

FIG. 12 is a sectional view taken substantially along the line 12—12 of FIG. 3;

FIG. 13 is a side view of the elevating mechanism as taken along the line 13—13 of FIG. 12;

FIG. 14 is an enlarged detail view of a portion of the elevating mechanism as taken along the line 14—14 of FIG. 17;

FIG. 15 is a sectional view taken substantially along the line 15—15 of FIG. 13;

FIG. 16 is a sectional view taken substantially along the line 16—16 of FIG. 13;

FIG. 17 is a fragmentary view of the elevating mechanism from the lower end thereof as indicated by the lines 17—17 in FIG. 13;

FIG. 18 is a fragmentary view of the elevating mechanism from the upper end thereof as indicated by the lines 18—18 of FIG. 13;

FIG. 21 is a side view of the steering wheel partially in section taken along the line 21—21 of FIG. 6;

FIG. 22 is a detail view of an adjustment on the steering wheel taken along the line 22—22 of FIG. 21;

FIG. 23 is a view illustrating the mounting and drive of the transverse brush taken substantially along the line 23—23 of FIG. 6;

FIG. 24 is a cross sectional view taken along the line 24—24 of FIG. 23;

FIG. 25 is a fragmentary side view similar to FIG. 3 and illustrating further features of construction;

FIG. 26 is a somewhat schematic view showing a control valve mechanism suitable for use with the cylinders for raising and lowering the dust box and for controlling the closure member thereon; and FIG. 27 is a schematic view of another control valve such as may be used for controlling lifting cylinders of the brushes and elevating mechanism.

Figures 19, 20:
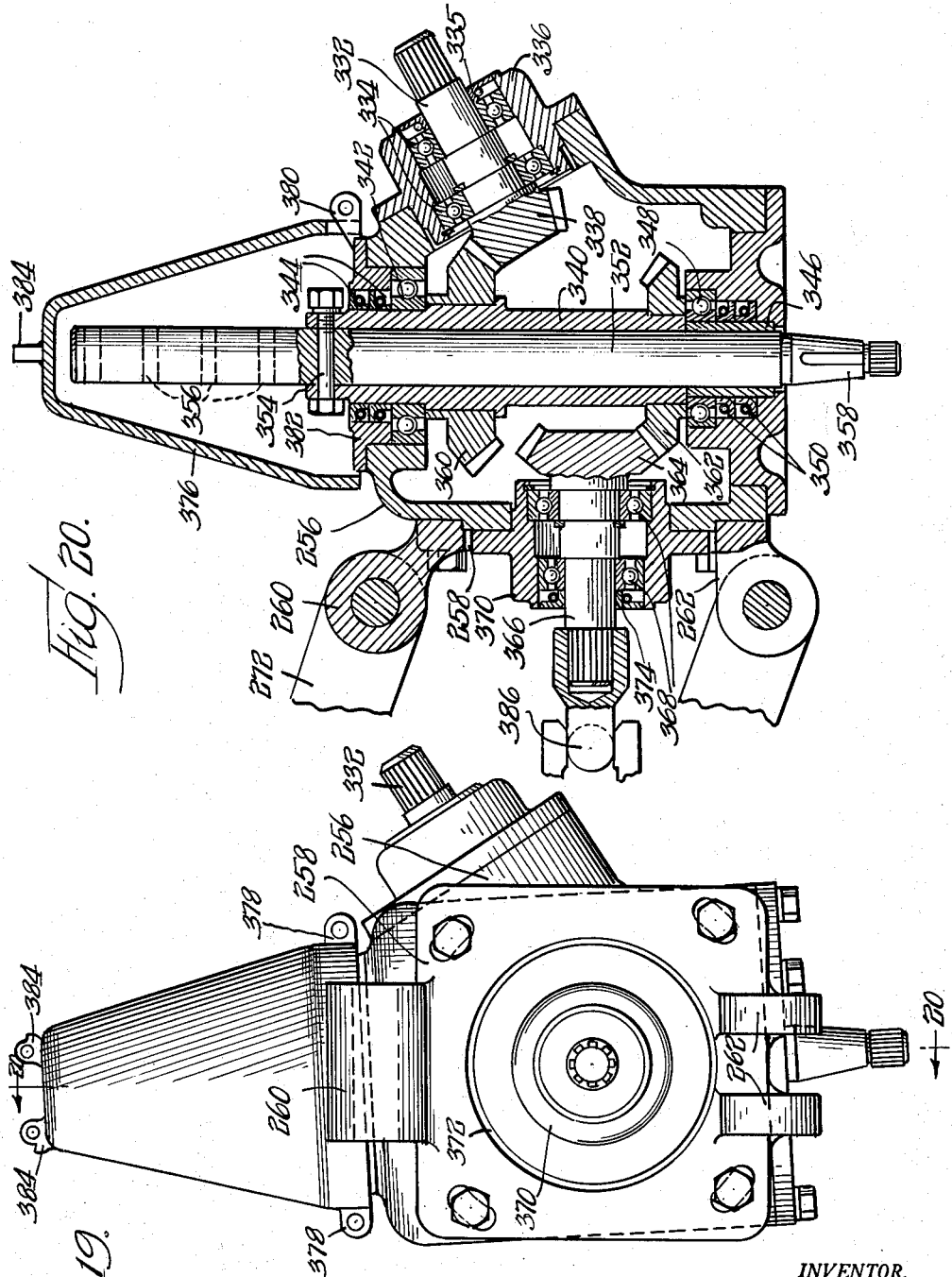
FIG. 19 is a view taken along the line 19—19 of FIG. 7.
FIG. 20 is a vertical sectional view along the line 20—20 of FIG. 19.

Referring now in greater particularity to the figures, and first to FIGS. 1–5, there is shown a street sweeper generally designated by the numeral 30. The street sweeper comprises generally a channel-shaped main frame 32 supported at the front end by a pair of transversely spaced driving wheels 34 having pneumatic tires 36 and supported at the rear end by a single, centrally disposed, steering wheel 38 having a pneumatic tire 40.

An engine 42 is mounted at the rear of the sweeper and facing rearwardly of the sweeper for driving the sweeper and the various brushes and the elevating mechanism. A casing 44 encloses the engine. A cab 46 is located forwardly of the engine and includes a roof 48, front corner posts 50 supporting a windshield, and rear corner posts 52 which preferably support a rear wall having a window therein. The cab 46 houses a pair of operator's seats 54, a pair of steering wheels 56, two sets of clutch and brake pedals 58 and 60 respectively and a pair of gas or accelerator pedals 62 as well as a single gear shift lever 64 and a series of hydraulic control levers 66. It will be apparent that the duplicate controls allow the operator to sit on either side of the cab in order best to observe the gutter or the side of the street so as to do a neat sweeping job without placing undue strain upon the mechanism.

A dust box 68 is shiftably mounted at the front end of the street sweeper on a boom structure 70 and is covered by a cowl section 72. A fixed cowl 74 extends rearwardly from the cowl section 72 to the cab 46. The dust box 68 is open at the upper end and is closed at the lower end by a cover or closure member 76. The shiftable cowl section 72 carries a spray pipe or series of spray nozzles 78 at its forward lower end for discharging a spray of water 80 on to the street to prevent spreading of dust.

The sweeper further includes a pair of curb brushes 82 spaced at opposite sides and rotatable about substantially vertical axes. The right-hand curb brush 82 rotates counterclockwise and the left-hand curb brush clockwise to throw dirt or dust from the gutter under the center of the sweeper where it is picked up by a main or transverse brush 84 and swept into an elevator generally designated by the numeral 86 for raising from the street level to the top of the dust box.

The driving mechanism

The motor 42 is bolted directly to the casing 88 of an auxiliary drive transmission and the casing 88 is in turn bolted directly to the casing 90 of a conventional multispeed shiftable gear truck transmission. Thus the engine and two transmissions form a single rigid power unit. A frame channel member 92 (FIGS. 3–6) extends transversely across the main frame 32 directly below the auxiliary transmission casing 88 and the transmission casing is supported thereon at two spaced apart points. The transmission casing is provided with a pair of lateral bosses 94 and footings 96 which may be formed integrally therewith and extend downwardly therefrom to the channel member 92 to which part lower horizontal flanges 98 are secured by means such as bolts to the channel member 92. It will be understood that resilient members such as rubber blocks preferably are interposed between the footings 96 and channel member 92 to provide a conventional floating support. A transverse support 100 (FIGS. 4 and 5) extends across the rear of the frame 32 and a footing 102 (FIG. 1) extends from the rear of the engine to this support, a resilient member such as a rubber block preferably being incorporated between the footing 102 and transverse support 100 to afford a floating suspension. The footings 96 and 102 provide the sole support for the rigidly bolted together engine and transmission casings and this support is in the form of a three point suspension so that strain is not imposed on the engine and transmissions by deflection of the main frame 32 or of any of the auxiliary frame members.

The engine 42 is provided with a radiator 104 (FIGS. 1 and 6) supported from the main frame 32 in any approved manner and interconnected with the engine water jacket by the usual hose connections (not shown). A cooling fan 106 (FIGS. 1 and 5) is rotatably mounted at the top of the engine and is driven by a flexible belt 108 by a pulley on a drive shaft 110. An extension 112 of the shaft 110 drives a hydraulic pump 114 for actuating the various lifting mechanisms as will be set forth hereinafter. The pump is supported by a bracket 116 which conveniently may form a part of the engine footing 102.

Gasoline for the engine 42 is stored in a pair of tanks 118 (FIGS. 1, 3 and 6) located directly behind the drivers' seats 54 and supported by springs 120 mounted on suitable supporting framework 122 carried by brackets 124 upstanding from the transverse channel member 92. Gas lines 126 lead from the tanks to the engine to which they are connected by conventional means (not shown).

The auxiliary transmission housed in the casing 88 is provided with a transverse drive shaft 128 (FIGS. 3, 4 and 6) suitably geared to the main drive shaft of the engine 42 and preferably clutched to the gearing by a clutch mechanism actuated by a lever 130 extending between the drivers' seats and connected to the clutch mechanism by linkage 132. The drive shaft 128 drives the brushes and the elevator mechanism as will be apparent hereinafter.

The conventional shiftable gear transmission in the casing 90 is driven by the gearing in the auxiliary transmission and is shiftable by means of the gear shifting lever 64 between the drivers' seats. The shiftable gear transmission is provided with a conventional clutch operated by the clutch pedals 58 (connections not shown). An output shaft 134 (FIGS. 3–5) extends forwardly from the transmission casing 90 and is connected by a universal joint 136 to a propeller shaft 138. The propeller shaft is connected through a universal joint 140 to the input shaft 142 of the differential 144 of a conventional truck axle 146 on which the drive wheels 34 are mounted. It will be noted that the propeller shaft extends along the center line of the street sweeper and that no special connections or gearings are necessary to extend around the elevator mechanism to drive the axle.

The steering mechanism

The rear steerable wheel 38 is carried by a bracket 148 (FIGS. 1, 6 and 21) rotatably secured in a mounting fixture 150. The mounting fixture 150 is carried by a transverse support 152 (FIG. 4) extending between the side members of the main frame 32. The mounting fixture includes a body portion 154 having a vertical cylindrical center aperture 156. A pair of spaced apart mounting lugs 158 depends from the central body portion and a pair of longitudinally disposed ears 160 lies on opposite sides of the body portion and have adjusting bolts 162 threaded therethrough. Locking nuts 164 are provided on the bolts 162.

An intermediate member 166 has a cross shaft 168 journaled in bearings in the depending lugs 158 and is provided with a cylindrical upstanding boss 170 fitting in the aperture 156. The aforementioned bolts 162 abut against forwardly and rearwardly extending brackets or ears 172 on the intermediate member for adjusting its position about the shaft 168. The intermediate member is provided with a central opening 174 closed at the top by a cup-shaped cap 176. A shaft 178 is rotatably secured in the central opening 174 by tapered roller bearings 180 and 182 and by a nut 184 threaded on the upper end of the shaft. A sealing ring may be included at 186 between a shoulder section 188 integral with the bottom end of the shaft and the lower portion of the inside wall of the opening 174 to retain oil or grease in the central opening 174. A substantially circular plate-like member 190 is formed integrally with the shoulder 188 and shaft 178 and is secured by bolts 192 to a transverse bar 194 forming a part of the bracket 148. A pair of side flanges 196 extends downwardly from the transverse bar 194 in parallel relation on either side of the wheel 38. A pair of stub shafts 198 extends transversely from the flanges 196.

A pair of mounting flanges 200 is secured on either side of the flanges 196 by means of bolts 202 fitting through arcuate slots 204 and threaded into the flanges 196. The upper edge of each mounting flange 200 is provided with a semicircular notch receiving one of the stub shafts 198 and a mounting block 206 is fixed to or formed integral with each flange 200 at the top thereof and likewise has a semicircular recess 208 receiving one of the stub shafts 198. A shiftable block 210 having a semicircular recess 212 is bolted to the top of each mounting block 206 by bolts 214. Opposed brackets 216 near the bottom of each mounting flange 200 carry set screws or bolts 218 abutting the edges of the side flanges 196. The mounting flanges 200 are adjustable about the stub shafts 198 by loosening the bolts 202 and adjusting the set screws or bolts 218. The bolts 202 then are tightened and jam nuts 220 on the screws or bolts 218 likewise are tightened to lock the flanges in adjusted relation.

Blocks 222 are carried on the lower inner faces of the flanges 200 and are provided with semicircular recesses 224 for receiving the axle 226 carrying the steerable wheel 38. Complementary blocks 228 likewise having semicircular recesses 230 are secured to the blocks 222 by nuts and bolts 232 to retain the axle 226 in place.

Steering arms 234 (FIGS. 4 and 6) extend laterally outwardly from the flange or plate 190 and are connected to right and left steering links 236 and 238 respectively. Link 236 is connected to a substantially V-shaped lever 240 pivoted at 242 on a pivot supported by the cross channel 92 and link 238 is connected to a bell crank lever 244 pivoted at 246 on a pivot which may be supported by the cross channel member 92. Actuating links 248 and 250 respectively are pivotally connected to the levers 240 and 244 and to suitable conventional steering apparatus at the lower ends of the columns 252 carrying the steering wheels 56. It will be seen that either steering wheel 56 thus is capable of shifting one or the other of the links 48 longitudinally to turn the wheel 38 and thus to steer the street sweeper.

*The curb or gutter brushes*

The curb or gutter brushes 82 are mounted on substantially vertical shafts 254 extending from driving mechanism housings 256 (FIGS. 1, 2, 5 and 7–11). A mounting plate 258 is bolted to the side of each mechanism housing 256 and is provided with cylindrical mounting ears 260 along the upper edge and with a pair of spaced apart mounting lugs 262 at the bottom edge.

A pair of side walls 264 extends downwardly from the main frame 32 and is braced by front and rear transverse walls 265 and 266 and the rear wall 266 extends laterally through the side walls 264. Cylindrical mounting ears 268 are fixed to the side plates 264 abutting the rear plate 266 and near the top of the rear plate. A pair of links 270 and 272 is pivoted on each ear 268 and also on one of the ears 260 of the plates 258, the links being provided with offset portions 274 and 276. Each pair of links 270, 272 is maintained in spaced apart relation by spacers 278 welded or otherwise secured to the links.

An upstanding mounting bracket 280 is secured at the outer end of each pair of links and a pair of counterbalancing springs 282 is stretched between each bracket 280 and an upper portion of the adjacent side wall 264, suitable eye bolts being provided for attachment of the springs.

The lower pair of lugs 262 on each plate 258 is connected by a link 284 to the rear plate 266 where it is pivotally connected. The ends of each link 284 are equally spaced from the ends of each link 270 and the effective lengths of the links themselves are equal to constitute a parallel motion mechanism so that each plate 258 shifts substantially only straight up and down. In order to accommodate side thrust imparted to one of the gutter brushes 82, as imparted by too close an approach to the curb, each link 284 is made compressible. Each link 284 as best seen in FIG. 11 comprises a rod 286 having a bifurcated connector 288 at the end thereof which is pivotally connected to the plate 266. The rod is slidably received in a sleeve 290 having a cup-shaped socket portion 292 welded thereto and providing a shoulder portion 294. The rod 286 is provided with a collar 296 preventing retraction of the rod from the sleeve 290. A cylinder 298 is threaded into the cup-shaped socket 292 and has an enlarged end 300 of a bolt 302 welded in its end opposite the socket 292. The bolt 302 is threadedly received in a connector 304 having a split clamp portion 306 for locking the bolt against accidental loosening. The connector 304 is provided with an offset lug 308 pivotally connected between the pair of ears or lugs 262 at the bottom of the plate 258. A coil spring 310 is contained within the cylinder 298 and is compressed between the bolt head 300 and the collar 296 so as normally to maintain the link 284 in its fully extended position to insure straight up and down movement of the plate 258, of the drive mechanism casing 256, and of the curb or gutter brush 82 carried thereby. It will be understood that the spring 310 will compress to allow the associated brush 82 to be displaced sidewise without damage when excessive side thrust is applied to the brush as by approaching a curb too closely.

The curb or gutter brushes are driven by the transverse shaft 128 extending from the auxiliary transmission casing 88. The right end of the shaft 128 is connected by means of a universal joint 312 (FIGS. 4 and 6) to a drive link 314 which in turn is connected by a universal joint 316 to the input shaft 318 of a drive mechanism 320. The drive mechanism 320 is mounted on a bracket 322 extending from the side of a main frame 32 and includes suitable gearing for driving an output shaft 324 at right angles to the input shaft 318. The output shaft 324 is provided with a universal joint 326 (FIGS. 1, 4 and 5) by means of which it drives a jack shaft 328. This shaft is coupled by a universal joint 330 to the input shaft 332 (FIGS. 1, 4, 19 and 20) of the drive mechanism contained in the housing or casing 256.

The input shaft 332 is journaled in antifriction bearings 334 (FIG. 20) carried by a hub 336 angularly disposed in casing 256 and sweated therein or otherwise suitably fixed in place. A sealing ring 335 is provided to retain lubrication in the housing. A bevel gear 338 is fixed on the end of the input shaft 332.

A sleeve 340 is journaled in antifriction bearings 342 in the top of the housing or casing 256. Sealing rings 344 overlie the bearings 342 to retain grease in the housing. A second sleeve 346 is journaled in ball bearings 348 at the bottom of the housing and extends coaxially from the end of the sleeve 340. Sealing rings 350 below the bearing retain grease in the housing. A spindle 352 which is cylindrical throughout the greater portion of its length fits through the sleeves 340 and 346 and is fixed to the sleeve 340 by a bolt 354 passing through any one of a series of radial apertures 356 in the spindle. The tapered lower end 358 is adapted to mount the shaft or axle 254 of the broom 82. As the broom wears out it may be lowered to keep it in contact with the street by shifting the bolt 354 into progressively higher apertures 356 in the spindle 352.

A bevel gear 360 is fixed on the sleeve 340 and meshes with the bevel gear 338 to drive the sleeve 340. A second bevel gear 362 fixed on the sleve 340 meshes with a bevel gear 364 fixed on a stub shaft 366. The stub shaft 366 is journaled in ball bearings 368 in a hub 370 sweated in the side of the housing 256 or otherwise suitably secured therein and fitting in a central aperture 372 in the plate 258. A sealing ring 374 is provided outside the outermost bearings 368. A frusto conical cap 376 is placed over the upper end of the spindle 356 and is held in place by pins fitting through ears 378 on the cap and in cooperating ears 380 projecting through slots in the lower edge of the cap from the retaining member 382 fitted within the upper end of the housing 256 and holding the sealing rings 244. An additional pair of ears 384 is provided at the top of the cap and a wire may be passed between these ears for lifting the cap.

A universal joint 386 (FIGS. 7, 10 and 20) couples the stub shaft 366 to a cross shaft 388. The cross shaft 388 is coupled by means of a universal joint 390 to the input stub shaft 392 of the left-hand drive mechanism in the housing or gear box 256 which is identical with the right-hand drive mechanism except for the omission of the upper two bevel gears and the input shaft 332. The universal joint connection provides for relative up and down movement of the two brushes.

Provision is made for lifting the curb or gutter brushes 82 from the street for traveling as shown in FIGS. 1, 2 and 7. A hydraulic cylinder 394 is pivoted on each side of main frame 32 at 396 above the gutter brushes 82. The piston rod 398 extending from each cylinder 394 is pivotally connected to the short arm of a bell crank lever 400. Each bell crank lever 400 is pivoted on a bracket 402 carried by the main frame 32 and the long arm of the lever is connected to one end of a chain 404 the other end of which is connected to a bracket 280 on the links 270, 272. Actuation of the proper one of the handles 66 operates a valve to discharge hydraulic fluid under pressure from the pump 114 into the cylinders 394 to force the piston rods 298 rearwardly of the street sweeper to raise the brushes 82 aided by the counterbalancing springs 282. The links 270, 272 and 284 constitute a parallel motion mechanism insuring straight up and down movement of the brushes. Return of the handle 66 to its original position allows the set of the brushes and driving mechanism therefor to force hydraulic fluid from the cylinders 394 to allow the brushes to return to street level.

*The main or transverse brush*

The main or transverse brush 84 is mounted on arms 406 (FIGS. 1–3, 23 and 24) pivoted at opposite sides of the sweeper on brackets 408 depending from the main frame 32. Coil springs 410 are stretched between eye bolts 412 on the brackets 408 and U bolts 414 on the arms 406 for counterbalancing the brush. The brush axle 416 is journaled in plates 418 slidably mounted at the free ends of the arms 406 between outstanding guides 420 (see particularly FIGS. 23 and 24) by bolt-in-slot connections 422. The plate 418 further is positional by a set screw or bolt 424 threaded through a bracket 426 on the arm 406 and abutting the plate 418. A jam nut 428 preferably is provided to lock the set screw or bolt 424 in adjusted position.

On the left side of the street sweeper a pair of speed reducing sprockets 430 and 432 (FIG. 2) is mounted coaxially with the pivotal connection between the arm 406 and bracket 408. A sprocket 434 (see also FIGS. 6, 23 and 24) is bolted on to the left end of the brush 84 and an endless chain 436 is passed over this sprocket and over the sprocket 432 to drive the brush. The brush is of conventional construction having a core 438 which may be of wood. Bristles or fibers 440 which may be of wood, bamboo, or other material are held in a spiral groove 442 in the core by means of a rope or a cable 444. A cylinder 446 having a radial flange 448 is secured on each end of the core by means such as screws 450 properly to position the bristles or fibers 440 at the ends of the brush. A metallic insert 452 is bolted into each end of the core 438, the core being apertured axially for mounting the brush on the axle 416. The left-hand insert 452 is provided with threaded apertures to receive the bolts 454 mounting the sprocket wheel 434, a spacer ring 456 being placed between the sprocket wheel and insert.

The sprocket 432 is fixed to the sprocket 430 for rotation therewith and the sprocket 430 is driven by a chain 458 (FIGS. 2 and 4–6) passed over a driving sprocket 460 on an output shaft 462 of a drive mechanism or gear box 464. The input shaft 466 is connected by a universal joint 468 to a second universal joint 470 which in turn is coupled to the left end of the transverse shaft 128 extending from the auxiliary transmission casing 88. The drive mechanism 464 is carried by a bracket 472 on the main frame 32.

Hydraulic cylinders 472 (FIGS. 1 and 5) are mounted on the main frame 32 on opposite sides thereof and have their piston rods 474 pivotally connected to the short arms of bell crank levers 476 pivoted on brackets 478 on the main frame 32 (see also FIGS. 2 and 3) the ends of the long arms of the bell crank levers 476 are connected to the ends of chains 480 and the opposite ends of the chains are connected to apertured members 482 (see also FIG. 23) near the free ends of the arms 406. Actuation of the proper one of the handles or levers 66 operates a valve to admit hydraulic fluid under pressure from the pump 114 to the cylinders 472. This causes rotation of the bell crank levers and consequent lifting of the arms 406 to raise the main or transverse brush 84 from the street level for traveling purposes. The weight of the brush and mounting structure is sufficient to return them to the street level when the handle 66 and its associated valve are returned to their initial positions. It will be noted that no difficulty is encountered as a result of the change in spacing between the brush axle and the drive mechanism 464 as the brush is raised or lowered due to the pivotal movement of the brush mounting structure about an axis coincident with the axis of rotation of the two sprockets transmitting motion through the drive chains.

*The elevator mechanism*

The elevator mechanism 86 is shown in relation to the other parts of the sweeper in FIGS. 1–4, the general construction of the elevator best being seen in FIGS. 3 and 12. The elevator is provided at the upper end with a transverse drive shaft or axle 484. A drive mechanism 486 is mounted at the left end of the transverse axle or drive shaft 484 and is connected by means of a universal joint 488 to a jack shaft 490. The shaft 490 is connected by means of a universal joint 492 (FIGS. 2 and 4) to an output shaft 494 of the aforementioned drive mechanism 464.

The elevator 86 includes two pairs of longitudinal frame members 496, lower transverse or spacer frame member 498 and an intermediate transverse frame member or support 500 near the upper end of the elevator. The two outermost longitudinal frame members 496 are provided with each 502 (FIGS. 13 and 16) pivotally connected to ears 504 on the main frame 32 of the sweeper. Two inclined plates or slideways 506 having down turned upper ends 508 are supported in spaced apart relation by the pairs of longitudinal frame members 496. The plates 506 are spaced above the frame members 496 by spacers 510 and are separated from one another by the distance between the two central longitudinal frame members 496. Vertical central walls 512 are provided adjacent the confronting edges of the plates 506 and are secured to the central longitudinal frame members 496. The vertical central walls 512 extend from the lower edges of the plates 506 to the transverse drive shaft or axle 484 and the ends are deflected or turned inwardly at 514 to contact one another. The outer longitudinal frame members 496 are provided with vertical side walls 516. The side walls 516, plates 506, and 512 together define a pair of chutes 518. The plates 506 are braced from below by angularly disposed frame members 520 which, like the other frame members, preferably are angle irons. A gusset 522 is fitted into each of the two outermost lower corners of the elevator 86.

Brush guide or shaping plates 524 are carried at opposite ends of the main or transverse brush 84 by the elevator 86. The guide or shaping plates 524 are provided with upstanding and outwardly deflected fins 526 designed to engage the end bristles of the brush 84 to compact the brush into its normal desired length. An intermediate portion 528 of each guide or shaping plate leads to an upstanding and outwardly deflected fin 530 adapted to release the end bristles of the brush gradually. The end plates are supported by brackets 532 pivotally connected at 534 to mounting brackets 536 (see particularly FIGS. 13 and 15) on the outer longitudinal frame members 496. Ears 538 (FIGS. 13 and 17) on the brush guide or shaping plates 524 slidably overlap the side walls or plates 516 of the elevator to prevent outward deflection of the plates 524. Inwardly directed flanges 540 on the plates 524 interfit with the gussets 522 for limiting relative movement between the plates 524 and the remaining portions of the elevator 86 when the elevator is raised from street level for carrying or transporting purposes.

Axle mounting members in the form of plates 542 are pivotally mounted on ears 544 extending from longitudinal struts 546. Each longitudinal strut 546 is pivotally connected at 548 to a mounting block 550 at the upper end of each longitudinal frame member 496. The blocks 550 are interconnected by a transverse brace 552. Each longitudinal strut 546 is shiftably trapped adjacent its lower end beneath a strap or bracket 554 on the side plate or wall 516 and the lower end of the strut is fixed to a bearing block 556.

Each of the pivoted plates 542 is provided with spaced apart, parallel longitudinal guides 558 slidably engaging mounting lugs 560 of the axle drive mechanism 486 on one side and a bearing member 562 on the other side. Bolt-in-slot connections 564 afford longitudinal adjustment of the axle mounting members comprising the drive mechanism 486 and bearing member 562. Set screws or bolts 566 carried by ears 568 also are provided for longitudinal adjustment of the axle mounting members. Relieved portions 570 adjacent the bolt heads facilitate engagement thereof by a wrench, and jam nuts 572 are provided for positively locking the set screws or bolts 566 in adjusted position. The axle or shaft 484 passes through apertures in the side plates or walls 516 which are longitudinally elongated as at 574 for longitudinal adjustment of the axle mounting members and which are transversely elongated preferably along an arc as at 576 to allow relative pivoting movement between the plates 542 and the side walls or plates 516. Pivoting movement of the plates 542 is limited by overlying brackets 578 on the side plates 516 and by set screws or bolts 580 carried by lugs 582 on the side plates 516 and provided with jam nuts 584.

The bearing blocks 556 are provided with plates 586 in which is journaled a transverse idler shaft or axle 588. Two pairs of drive sprocket wheels 590 are fixed on the transverse drive shaft or axle 484 and two pairs of idler sprocket wheels 592 are fixed on the idler shaft or axle 588. Sprocket chains 594 are passed over the sprocket wheels and are maintained taut by the longitudinal adjustment of the upper axle mounting members. The idler shaft or axle 588 passes through the side plate or walls 516 through apertures 596 which are transversely arcuately elongated to allow relative pivoting movement between the side plates 516 and the longitudinal struts 546.

The sprocket chains 594 are provided, in pairs, with a plurality of equally spaced angle members 598. Each angle member carries a squeegee 600 of rubber or other suitable material extending transversely substantially from edge to edge of one or the other of the inclined plates or chutes 506. The squeegees 600 are secured to the angle members 598 by bolts 602 whereby the squeegees preferably are adjustable toward and away from the chains 594 so as always to contact the plates 506 as the squeegees wear away in use. It will be apparent that dirt and other trash is thrown forward on to the plates 506 by the transverse brush 84 and that the dirt then is pushed up the plates 506 by the squeegees 600 to the top of the plates where the dirt slides down the down turned ends 508 into the dust box 68. The use of two plates 506 rather than a single plate allows the propeller shaft 138 to be passed through the center of the elevator 86 so that no complicated drive mechanism is needed to drive the street sweeper. The divided elevator additionally facilitates servicing and repair. The deflected ends 514 of the central vertical plates 512 insure that all of the dirt will land on one or the other of the inclined plates 506 and will not pass through the center of the elevator. The mounting of the elevator drive shaft or axle and idler shaft or axle allows the shafts to shift away from the plates 506 if a piece of trash is caught between a squeegee and one of the plates. Such shifting prevents jams which might damage the mechanism.

Mechanism is provided for raising the elevator 86 from street level for traveling purposes. This mechanism includes hydraulic cylinders 604 (FIGS. 1, 2 and 5) mounted on the main frame 32. Piston rods 606 extending from the cylinder 604 are pivotally connected to the short arms of bell crank levers 608 which are pivotally mounted on ears 610 depending from the main frame. Chains 612 are fixed at one end to the long arms of the bell crank levers and at the other end to the elevator for raising the same. Actuation of the cylinders 604 is controlled by a valve operated by one of the handles 66 similarly to the other lifting mechanisms disclosed heretofore.

It is apparent that the transverse drive shaft or axle 484 must remain at a substantially constant distance from the driving mechanism 464 connected to the auxiliary casing due to the rigid shaft 490 and that the drive shaft or axle 484 and idler shaft 588 must remain spaced apart a substantially constant distance to maintain the chains 594 taut. As the elevator is raised or lowered, it pivots about its mounting 502, 504 and as this mounting is not coincident with the driving axle 484 the axle shifts in the transversely elongated apertures 576 of the side plates as the plates 542 and struts 546 relatively pivot about their connections 544 and the struts pivot relative to the side plates about the pivotal connections 548. It will be seen that the plates 542 and struts 546 maintain the drive shaft or axle 484 and idler shaft or axle 588 a substantially constant distance apart and that the arcuate slots 596 allow shifting of the idler shaft relative to the side plates as the struts pivot slightly.

*The dust box*

The dust box 68 and cowl section 72 mounted thereon are supported from the main frame 32 by means of upstanding and forwardly extending brackets 614 (FIGS. 1-4 and 7). A pair of arms 616 and 618 is mounted at each side of the sweeper by pivotal connections 620 and 622. The arms also are pivotally connected at 624 and 626 on plates 628 mounted on the dust box 68. The arms 616 and 618 and pivotal connections constitute the parallel motion mechanism 70 referred to previously.

Each of the arms 618 is provided with a plate or bracket 630 to which a piston rod 632 is pivotally connected at 634. The piston rod extends from a hydraulic cylinder 636 pivotally connected at 638 to a bracket or arm 640 on the main frame 32 of the sweeper. The hydraulic cylinders 636 are under the control of a valve mechanism operated by one of the handles 66 as will be apparent hereinafter.

The dust box 68 is provided with an inclined rear wall 642, an arcuate front wall 644, parallel side walls 646, and is open at the top to receive dirt and other trash from the elevator 86. The bottom of the dust box is arcuate in configuration and is closed by the closure member or cover 76 which is carried by arms 648 pivoted at 650 on the side walls 646 of the dust box. The closure member or cover 76 is opened as shown in FIG. 2 by hydraulic cylinders 652 pivotally connected at 654 to the plates 628. Piston rods 656 extending from the cylinders are pivotally connected at 657 to arms 658 on the brackets 648. Flexible hydraulic connections or hoses 660 extend from the cylinders 652 back to the main portion of the sweeper.

The cowl section 72 carries a shield 662 which supports the separate nozzles 78 by means of brackets 664. The nozzles 78 are located on a pipe 666 fed by a flexible conduit or hose 668 (FIGS. 5 and 25) from a water pump 670 (FIGS. 3, 5 and 25) driven by a belt 672 from a power take-off 674 on the side of the conventional shiftable gear transmission housing or casing 90. Water is stored in tanks 676 (FIGS. 1-5 and 25) located adjacent the cab 46 and immediately below the fixed cowl section 74 and in tanks 678 adjacent the axle 146. The tanks are interconnected by pipes or hydraulic conduits 680. A pipe or conduit 682 (FIG. 25) leads from the bottom of the tanks 678 to the pumps 670 and the pipe conduit 684 leads from the pump to a valve under control of one of the handles 66.

*The hydraulic controls*

Reference should be had to FIGS. 25-27 for further details on the hydraulic connections and controls. The operating handles or levers 66 are pivoted at 686 on brackets 688 depending from a wall 690 above the steering wheels 56. Each of the levers 66 is pivotally connected to a connecting rod 692. Two of the handles control the raising and lowering of the dust box and the opening of the closure member thereon. Another of the handles controls the various mechanisms for raising the brushes and the elevator while the last handle controls the spray from the nozzles 78.

The hydraulic pump 114 receives hydraulic fluid from a reservoir (not shown) located at any convenient position in the street sweeper and a hydraulic line 694 leads from this pump to a valve block 696. The valve block 696 is provided with a pair of spool valves 698 and 700. The spool valves are longitudinally shiftable and are controlled by two of the connecting rods 692. The spool valve 698 occupies any one of three positions, open, neutral, or close. The spool valve 700 likewise is shiftable to occupy any one of three positions, raise, hold, or lower.

The inlet line 694 communicates with a passageway 702 which leads to an annular chamber 704 and this in turn leads to a passage 706 communicating with an annular chamber 708. With the valve 700 raised from the position shown, the annular passage 708 is open to an annular passage 710 leading to a passage 712 connected to hydraulic lines 714 leading to the cylinders 636 for raising the dust box. The passageway described to the valve 708 always is open regardless of the position of valve 698. Hydraulic fluid entering the cylinders 636 shifts the pistons therein to the piston shown in FIG. 26 and this causes the piston rods 632 to operate the parallel motion mechanism 70 to raise the dust box 68 to the position shown in FIG. 2, the dust box shifting parallel to its normal position with no tipping.

With the valve 700 in the position shown in FIG. 26, the annular passage 710 is sealed off and the dust box is held in raised position. Lowering of the valve 700 opens the annular passage 710 to an annular passage 716 communicating with a passageway 718. The passageway 718 communicates with an annular passage 720 and with a passage 722 leading to a line 724 which returns to the reservoir (not shown). The weight of the dust box, cowl, and spray mechanism causes the piston to force the hydraulic fluid from the cylinders 636 for lowering of the dust box.

When the dust box 68 is closed by the closure member 668 the valve 698 may be in intermediate position. To open the dust box, the valve 698 is raised as shown in FIG. 26 which allows oil under pressure to pass from the conduit 694 through the passageway 702 and annular passage 704 to an annular passage or chamber 726 and from thence to a passageway 728 leading to one of the flexible hose connections 660. This acts on the pistons in the cylinders 652 to force the piston rods 666 out and thus to shift the cover to closure member 76 away from the bottom of the dust box as shown in FIG. 2. Hydraulic fluid or oil in the opposite ends of the cylinders 652 is discharged through the remaining flexible conduits or hoses 660 to a passageway 730 communicating with an annular passageway 732. The annular passageway 732 is open in turn to an annular passageway 734 leading to a passage 736 communicating with a passage 738 open to the aforementioned passage 716. Hydraulic fluid from this point flows through the previously mentioned conduits 718 and 722 to the return line 724. Shifting of the valve 698 part way down into neutral position closes off the annular passageways 726 and 732 so that the closure member is held in open position.

Further downward shifting of the valve 698 to close position opens the annular passage 732 to an annular passage 740 communicating with a passageway 742 receiving hydraulic fluid from the input line 694. This delivers oil under pressure to the opposite ends of the cylinders 652 to cause retraction of the piston rods 656 and hence closure of the cover or closure member 76. Hydraulic fluid in the opposite end of the pistons is discharged through the lines 660 to the annular passageway 726 which now is open and continues to an annular passageway 744 communicating with the previously mentioned passage 738 which is open to drain line 724 through annular passage 716 and passageways 718 and 722.

A valve structure suitable for use with the various cylinders for raising the brushes and elevator mechanism is shown in FIG. 27. This valve mechanism includes a valve block 746 which may be formed integral with the valve block 696 if desired. A passageway 748 receives hydraulic fluid from the input line 694 and with valve 750 in the position shown, the passageway 748 is open to a passageway 752. The passageway 752 is connected to a hydraulic line 754 leading to the hydraulic cylinder 604 for raising the elevator mechanism 86. The line 754 also is connected to branch lines 756 and 758 leading to the cylinders 394 and 472 for raising the gutter brushes and main brush respectively. When the valve 750 is lowered to a neutral position through the intermediary of one of the connecting rods 692 upon proper manipulation of one of the handles 66, the input passage 748 is blocked off and the brushes and elevator remain in raised position for traveling. Further lowering of the valve 750 opens the passage 752 to a passage 760 leading to the drain line 724 so that the brushes and elevator are allowed to return under their own weight to street sweeping position, hydraulic fluid being expelled from the cylinders through the lines 754, 756, 758 to the passageway 752 and thence to the passageway 760 and drain line.

The valve for controlling the passage of water from the pump 670 to the spray nozzles 78 is a conventional valve having only two positions, open and closed, and therefore this valve is not illustrated. This valve is under the control of the fourth or last handle 66.

Operation of the street sweeper will be apparent with no further description. The appropriate driver's seat 54 is occupied to allow the curb on the side of the street to be seen readily and the sweeper is driven in the same manner as any other automotive vehicle. The valves are actuated by the handles 66 as indicated heretofore to bring the brushes and elevator into street sweeping position, to actuate the spray 80, and to raise the dust box and open the closure member thereon. The dust box may be raised to any height from fully lowered as shown in FIG. 1 to fully raised as shown in FIG. 2 to dump dirt and trash from the dust box into a truck, thus obviating the necessity of dumping the dirt on the street and then loading the dirt up into a truck.

It will be apparent that various changes can be made in the form of the invention without departing from the principles thereof. The right therefore is expressly reserved to make all such changes as fall within the spirit and scope of the appended claims.

I claim:

1. In a street sweeper having a wheeled frame, the combination comprising a body open at its forward end, a liftable dust box closing the open end of said body when in lowered position, a pair of spaced apart upstanding supports mounted substantially at one end of said frame, a pair of links of equal length pivotally connected to each of said supports in a generally vertical common plane, the points of pivotal connection being spaced apart a predetermined distance, means pivotally connecting the links to the said dust box forwardly of and in a plane substantially parallel to the plane of their pivotal connections to their supports, said last named pivotal connections likewise being spaced apart said predetermined distance, said links normally supporting said dust box in position closing the front end of said body, hydraulic means for pivoting at least one of each pair of links about its pivotal connection to said support to shift said dust box upwardly and outwardly, said dust box at all times remaining parallel to its initial position, and hydraulic means for opening the bottom of the box to dump dirt and the like from said dust box.

2. In a street sweeper having a wheeled frame, an operator's station carried by said frame, a body having a cowl extending forwardly from said operator's station over said frame, a said body having an open forward end, a liftable dust box closing the forward end of said body and having a portion comprising an extension of said cowl when the dust box is in lowered position, a parallel motion mechanism interconnecting said dust box and said frame, hydraulic means for actuating said parallel motion mechanism to shift said dust box forwardly and upwardly from said body to elevated positions, said dust box having a dump door at its bottom end for dumping dirt and the like from said dust box, and hydraulic means for opening said bottom dump door to dump dirt and the like from said dust box in any position of said box.

3. In a street sweeper having a wheeled frame, an operator's station carried by said frame, a body having a cowl extending forwardly from said station and overlying said frame, said body being open at its forward end, a liftable dust box closing the open end of said body and having a body portion extending forwardly from said cowl as a continuation thereof when in lowered position, said dust box having open upper and lower ends, the upper end opening under said cowl, a closure member for the lower end of said dust box, power operated brush means for sweeping dirt and the like from the street, an elevator for raising the swept dirt and discharging into the open upper end of said dust box, parallel motion mechanism supporting said dust box from said frame, hydraulic means for shifting said dust box and shiftable body portion forwardly and upwardly away from the open end of said body into dumping position, and hydraulic means for shifting said closure member away from the open lower end of said dust box to dump dirt and the like from said dust box in any position of said box.

4. In a street sweeper having a wheeled frame, the combination comprising a body portion open at its forward end, a dust box open at its upper and lower ends and having a dump door at its lower end, a pair of spaced apart upstanding supports mounted substantially at one end of said frame, a pair of links of equal length pivotally connected to each of said supports in a common generally vertical plane, the points of pivotal connection being spaced apart a predetermined distance, means pivotally connecting said links to said dust box in a generally vertical plane, parallel to said first mentioned plane, said last named pivots likewise being spaced apart said predetermined distance, said links normally supporting said dust box when in lowered position closing the forward end of said body, hydraulic means for pivoting at least one of each pair of links about its pivotal connection to said support to shift said dust box upwardly and outwardly, said dust box at all times remaining parallel to its initial position, and hydraulic means carried by and shiftable with said dust box for opening the bottom dump door of the dust box to dump dirt and the like from said dust box.

5. In a street sweeper having a wheeled frame, the combination comprising a body open at its forward end, a dust box having an open lower end, a closure member for the lower open end, means for pivotally mounting said closure member on said dust box for shifting said closure member downwardly and horizontally away from said box for dumping the contents thereof, a pair of spaced apart upstanding supports mounted substantially at one end of said frame, a parallel motion mechanism pivotally connected to said upstanding supports and to said dust box for supporting said box for movement from a lowered position, closing the forward end of the body to elevated positions away from the body, hydraulic means for actuating said parallel motion mechanism to shift said dust box between said positions and hydraulic means for shifting said closure member away from the open lower end of said dust box.

6. In a street sweeper having a wheeled frame, the combination of a body open at its forward end, a forwardly extending and downwardly inclined dirt box on the front portion of the frame and facing in the direction of travel of said frame, said box having an open upper end to receive sweepings and an open bottom, the inclination of the box being always sufficient to deliver by gravity the contents of said box through its open bottom, parallel motion mechanism for mounting said box on said frame from a lowered position closing the open end of said body to elevated positions, manually controlled hydraulic means operating through said parallel motion mechanism for raising and lowering said dirt box to different elevations, the longitudinally extending bottom edges of said dirt box being arcuate in shape, a closure of like arcuate shape for said open bottom, said closure being pivoted on said dirt box at a point offset from the central axis of the arcuate bottom edges of the box whereby said closure as it is swung on its pivot to open position rocks forwardly away from said open bottom, also downwardly therefrom to provide adequate clearance, and manually controlled hydraulic means to swing said closure between open and closed positions with relation to said open bottom at any point of its elevation.

7. In a street sweeper having a frame, the combination comprising a dust box adapted to receive dirt and the like at a position well above street level, brush means for sweeping dirt and the like from the street, an elevator for raising the swept dirt from street level to discharge said dirt into said dust box, an axle extending transversely of said frame and having a driving connection intermediate the ends thereof, driving wheels on said axle, an engine carried by said frame on the opposite side of said elevator from said axle, and a drive shaft extending through said elevator from said engine to said drive connection on said axle for driving said sweeper.

8. In a street sweeper having a frame, the combination comprising a dust box adapted to receive dirt and the like at a position well above street level, brush means for sweeping dirt and the like from the street, an elevator for raising the swept dirt substantially from street level to discharge said dirt into said dust box, said elevator being substantially symmetrical about the central, longitudinal vertical plane of said frame, an axle extending transversely of said frame and having a driving connection substantially at the center thereof, driving wheels on said axle, an engine carried by said frame on the opposite side of said elevator, a power output shaft substantially on the central, longitudinal vertical plane of said frame and driven by said engine, and a drive shaft extending through said elevator substantially along said central, longitudinal vertical plane from said power output shaft to said drive connection on said axle for driving said sweeper.

9. In a street sweeper having a frame, the combination comprising a dust box adapted to receive dirt and the like at a position well above street level, brush means for sweeping dirt and the like from the street, a pair of inclined plates having their lower ends adjacent the street level for receiving the swept dirt and having their upper ends adjacent said dust box, said plates being disposed in parallel, spaced apart relation in a common plane, means for pushing the swept dirt up said plates and into said dust box, an axle extending transversely of said frame and having a driving connection substantially at the center thereof, driving wheels on said axle, an engine carried by said frame on the opposite side of said elevator from said axle, power output means driven by said engine and located substantially on the central, longitudinal vertical plane of said frame, and a drive shaft extending between said plates from said power output means to the drive connection on said axle for driving said sweeper.

10. In a street sweeper having a frame, the combination comprising a dust box adapted to receive dirt and the like at a position well above street level, brush means for sweeping dirt and the like from the street, a pair of inclined plates having their lower edges substantially at street level for receiving the swept dirt and having their upper edges adjacent said dust box, a drive shaft extending transversely across the plates substantially at one end thereof, an idler shaft extending transversely across said plates subtantially at the other end thereof, pairs of sprocket wheels on said drive shaft, pairs of sprocket wheels on said idler shaft, pairs of endless chains passing over corresponding pairs of sprocket wheels on said drive shaft and said idler shaft, a plurality of squeegees on each pair of chains and adapted to push dirt up said inclined plates and into said dust box, an axle extending transversely of said frame and having a driving connection substantially at the center thereof, driving wheels on said axle, an engine carried by said frame on the opposite side of said elevator from said axle, means for driving said drive shaft from said engine, and a propeller shaft extending between said plates and between the squeegees of different pairs of chains and interconnecting said engine and said drive connection for driving said sweeper.

11. In a street sweeper having a wheeled frame, a dust box, brush means for sweeping dirt and the like from the street, an elevator for raising the swept dirt and discharging the same into said dust box, said elevator having an inclined plate, means pivotally attaching said plate to said frame, an engine carried by said frame, a power take off driven by said engine, a transverse drive shaft on said elevator, a drive connection on said drive shaft radially spaced from said pivotal attaching means, a rigid length of shafting extending between said power take off and said drive connection, a transverse idler shaft on said elevator and spaced from said drive shaft, endless drive means on said shafts, pusher means carried by said endless drive means for pushing dirt and the like up said inclined plate, and means for maintaining said drive shaft and said idler shaft spaced apart a substantially constant distance, said last named means being shiftable relative to said plate.

12. In a street sweeper having a wheeled frame, a dust box, brush means for sweeping dirt and the like from the street, an elevator for raising the swept dirt and discharging the same into said dust box, said elevator having an inclined plate, means pivotally attaching said plate to said frame, an engine carried by said frame, a power take off driven by said engine, a transverse drive shaft on said elevator, a drive connection on said drive shaft radially spaced from said pivotal attaching means, a rigid length of shafting extending between said power take off and said drive connection, a transverse idler shaft on said elevator and spaced from said drive shaft, endless drive means on said shafts, pusher means carried by said endless drive means for pushing dirt and the like up said inclined plate, a pair of struts extending substantially longitudinally of said plate on opposite sides thereof, said struts being pivotally interconnected with said plate at one end thereof, means at the other end of said struts mounting one of said shafts, a support pivoted on each of said struts intermediate the ends thereof, means on said supports for mounting the other of said shafts, means limiting pivotal movement of said struts, and means limiting pivotal movement of said supports.

13. A street sweeper comprising a frame, a plurality of wheels carried by said frame for driving and steering said sweeper, brush means carried by said frame for sweeping dirt and the like from the street, a dust box, an elevator for raising dirt and the like substantially from street level for depositing the same in said dust box, an engine, transmission means driven by said engine for driving said brush means and said elevator, a casing for said transmission means, transmission means driven by said engine for driving at least one of said wheels, a casing for said last named transmission means, means for securing said engine and both of said casings together as a rigid unit, and three point suspension means for mounting said rigid unit on said frame.

14. A street sweeper comprising a wheeled frame, a dust box, an elevator for raising dirt and the like substantially from street level and depositing the same in said dust box, means for shiftably mounting said elevator on said frame, a pair of gutter brushes, means for shiftably mounting said gutter brushes on said frame, a transversely disposed cylindrical brush, means for shiftably mounting said cylindrical brush on said frame, and manually controlled hydraulic means for selectively shifting said gutter brushes, said cylindrical brush and said elevator upwardly away from the street for traveling purposes.

15. In a street sweeper having refuse collecting and elevating mechanism, the combination comprising a wheeled frame, a body portion open at its forward end, a forwardly extending and downwardly inclined dust box positioned at the front end of said wheeled frame, said box having an open bottom and the inclination of said box being always sufficient to deliver by gravity the contents of said box through its open bottom, parallel linkage means mounting said dust box on said frame, said parallel linkage means in the lowermost postion holding said dust box in position closing the forward end of said body portion and adjacent said elevating mechanism to receive refuse therefrom, means to move said parallel linkage means to raise and lower said dust box, the longitudinally extending bottom edges of said dust box being arcuate in shape, a closure of like arcuate shape for said open bottom, said closure being pivoted on said dust box at a point offset from the central axis of the arcuate bottom edges of said box whereby said closure as it is swung on its pivot to open position rocks forwardly away from said open bottom and also downwardly therefrom to provide adequate clearance, and means for moving said closure away from said bottom when the dust box is in an elevated position to dump refuse from said dust box onto an elevated conveyance.

16. In combination in a street sweeping machine including a body having an obliquely upwardly and forwardly arranged open front face portion, means for sweeping a surface over which the machine is directed and delivering the sweepings to said open front face portion, a dirt bucket having its major axis normal to said oblique front face portion and having its upper end cooperatively related to said oblique front face portion to receive the sweepings, and means connecting the dirt bucket to the sweeper body for movement bodily of the bucket into an elevated position separated from said front face portion, said bucket having a removable portion at an end remote from said open face portion displaceable, when the bucket is elevated, for the discharge of the bucket contents.

17. In combination in a street sweeping machine including a body having an obliquely upwardly and forwardly arranged open front face portion, means for sweeping a surface over which the machine is directed and delivering the sweepings to said open front face portion, a dirt bucket having its major axis normal to said oblique front face portion and having its upper end cooperatively related to said oblique front face portion to receive the sweepings, and means connecting the dirt bucket to the sweeper body for movement bodily of the bucket into an elevated position separated from said front face portion, said bucket having a removable portion at an end remote from said open face portion displaceable, when the bucket is elevated, for the discharge of the bucket contents, said connecting means comprising a parallel linkage including a lower link pivotally connected at one end to the side of the dirt bucket adjacent its lowermost corner and at its other end connected pivotally to the uppermost forward side portion of the sweeper body and a second link connected pivotally to the side of the dirt bucket in spaced vertical direction above the lower link and to a fixed pivot in spaced relation above the lower link and in fixed relation to the body, whereby in the separation of the dirt bucket from said forward face of the body the dirt bucket swings on an arc forwardly and upwardly when said removable portion is adapted to be displaced.

18. In a sweeping machine, including a hollow body for receiving the sweepings and formed open at one end and for the discharge of sweepings therethrough, a closure member for covering said open end and comprising a bucket having an open side in communication with the interior of said body for receiving and storing said sweepings discharged through said open end and means for holding said bucket in closure position against said open end of the body during said sweeping operation and for bodily swinging said bucket away from said open end and to an elevated discharge position substantially above and remote from said open end, said bucket having a closure removable from over a discharge opening in the bucket when the bucket is elevated and so that the bucket contents can be discharged through said discharge opening, said bucket when in closure position on the body being held so as to depend downwardly from said open end and as a continuation of the body in an inclined position for the sweepings to gravitate freely therein toward the bucket closure, and when in elevated position being substantially above the plane of the top of the body and being held in an inclined postion with said discharge opening lowermost.

19. In a sweeping machine, including a hollow body for receiving the sweepings and formed open at a forward end and for the discharge of sweepings therethrough,
    a closure member for covering said open end and comprising a bucket having an open side in communication with the interior of said body for receiving and storing said sweepings discharged through said open end and means for holding said bucket in closure position against said open end of the body during said sweeping operation and for bodily swinging said bucket away from said open end to an elevated discharge position substantially above and remote from said open end,
    linkage engaged between said body and opposite sides of said bucket for elevating the bucket relative to the body,
    hydraulic means for operating said linkage, said bucket having a closure removable from over a discharge opening in the bucket when the bucket is elevated and so that the bucket contents can be discharged,
    said bucket when in closure position on the body being held so as to depend downwardly from said open end and as an extension of the body in an inclined position for the sweepings to gravitate freely therein toward the bucket bottom,
    and when in elevated position being substantially above the plane of the top of the body and also then being in an inclined postion with said discharge opening lowermost for discharge of sweepings.

References Cited by the Examiner
UNITED STATES PATENTS

| | | | |
|---|---|---|---|
| 491,278 | 2/93 | Bertran | 15—85 |
| 533,222 | 1/95 | Kimball | 15—84 |
| 561,822 | 6/96 | Shadbolt | 214—77 |
| 781,166 | 1/05 | Scott et al. | 214—130 |
| 848,040 | 3/07 | Monette | 15—84 |
| 1,120,703 | 12/14 | Evans | 214—130 |
| 1,238,681 | 8/17 | Kaplan | 15—84 |
| 1,452,735 | 4/23 | Haworth | 15—87 X |
| 1,510,880 | 10/24 | Aitken | 15—87 X |
| 1,800,824 | 4/31 | Evans | 214—89 |
| 2,015,695 | 8/33 | Sapp | 94—44 |
| 2,199,703 | 5/40 | Hough | 15—84 |
| 2,217,283 | 10/40 | Lorrin | 294—69 |
| 2,231,545 | 2/41 | Myers | 298—1 |
| 2,233,005 | 2/41 | Garlinghouse | 214—130 |
| 2,236,814 | 4/41 | Evans | 15—87 X |
| 2,303,033 | 11/42 | Elliott | 298—1 |
| 2,314,381 | 3/43 | Arnett. | |
| 2,327,879 | 8/43 | Farrar | 15—84 X |
| 2,423,894 | 7/47 | Lambert | 214—140 |
| 2,558,623 | 6/51 | Mott | 15—87 |
| 2,614,279 | 10/52 | Mott | 15—83 |

CHARLES A. WILLMUTH, *Primary Examiner.*
SIDNEY JAMES, *Examiner.*